US012342150B2

(12) United States Patent
Han et al.

(10) Patent No.: US 12,342,150 B2
(45) Date of Patent: Jun. 24, 2025

(54) STEREO SOUND PICKUP METHOD AND APPARATUS, TERMINAL DEVICE, AND COMPUTER-READABLE STORAGE MEDIUM

(71) Applicant: Huawei Technologies Co., Ltd., Shenzhen (CN)

(72) Inventors: Bo Han, Shanghai (CN); Xin Liu, Beijing (CN); Wei Xiong, Shanghai (CN); Xiao Jing, Shanghai (CN); Feng Li, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 427 days.

(21) Appl. No.: 17/758,927

(22) PCT Filed: Jan. 12, 2021

(86) PCT No.: PCT/CN2021/071156
§ 371 (c)(1),
(2) Date: Jul. 15, 2022

(87) PCT Pub. No.: WO2021/143656
PCT Pub. Date: Jul. 22, 2021

(65) Prior Publication Data

US 2023/0048860 A1 Feb. 16, 2023

(30) Foreign Application Priority Data

Jan. 16, 2020 (CN) ......................... 202010048851.9

(51) Int. Cl.
*H04S 7/00* (2006.01)
*H04R 3/00* (2006.01)
(Continued)

(52) U.S. Cl.
CPC ............... *H04S 7/30* (2013.01); *H04R 3/005* (2013.01); *H04R 5/027* (2013.01); *H04R 29/005* (2013.01);
(Continued)

(58) Field of Classification Search
CPC ...... H04R 3/005; H04R 5/027; H04R 29/005; H04S 7/30; H04S 1/007
See application file for complete search history.

(56) References Cited

U.S. PATENT DOCUMENTS 9,716,944 B2 7/2017 Yliaho et al.
9,922,663 B2 3/2018 Chen et al.
(Continued)

FOREIGN PATENT DOCUMENTS

CN 102780947 A 11/2012
CN 103473028 A 12/2013
(Continued)

OTHER PUBLICATIONS

WHYLAB, "Be the consumer's own laboratory, A picture to read the iPhone microphone arrangement of previous generations," Published on May 23, 2019, downloaded from URL:https://zhuanlan.zhihu.com/p/66790045, 17 pages (with the English Translation).

*Primary Examiner* — Rasha S Al Aubaidi
(74) *Attorney, Agent, or Firm* — Slater Matsil, LLP

(57) ABSTRACT

A stereo sound pickup method and apparatus, a terminal device, and a computer-readable storage medium. The method includes configuring a terminal device to record a video, wherein the terminal device comprises a plurality of microphones, configuring the plurality of microphones to capture a sound, and forming a stereo beam based on the captured sound. The stereo beam is related to a video recording scenario of the terminal device, and the video recording scenario includes a posture of the terminal device
(Continued)

and usage of a camera, the posture includes that the terminal device is in a landscape mode or a portrait mode, and the usage of the camera includes that a rear-facing camera is used or a front-facing camera is used.

19 Claims, 10 Drawing Sheets

(51) Int. Cl.
*H04R 5/027* (2006.01)
*H04R 29/00* (2006.01)
*H04S 1/00* (2006.01)

(52) U.S. Cl.
CPC .......... *H04S 1/007* (2013.01); *H04S 2400/13* (2013.01); *H04S 2400/15* (2013.01)

(56) References Cited

U.S. PATENT DOCUMENTS

| | | | | |
|---|---|---|---|---|
| 9,967,691 | B2 | 5/2018 | Liu et al. | |
| 10,575,096 | B2 | 2/2020 | Wang | |
| 11,451,694 | B1 * | 9/2022 | Decrop | H04N 23/62 |
| 2015/0237455 | A1 | 8/2015 | Mitra et al. | |
| 2015/0358579 | A1 | 12/2015 | Shin | |
| 2016/0050488 | A1 | 2/2016 | Matheja et al. | |
| 2016/0227320 | A1 | 8/2016 | Harvey et al. | |
| 2016/0309076 | A1 | 10/2016 | Steinberg et al. | |
| 2017/0289681 | A1 | 10/2017 | Yuan | |
| 2018/0156887 | A1 | 6/2018 | Qiu et al. | |
| 2020/0137489 | A1 * | 4/2020 | Sheaffer | H04R 5/04 |
| 2021/0043223 | A1 * | 2/2021 | Lee | G02B 27/017 |

FOREIGN PATENT DOCUMENTS

| | | | |
|---|---|---|---|
| CN | 104244137 | A | 12/2014 |
| CN | 104424953 | A | 3/2015 |
| CN | 103888703 | B | 11/2015 |
| CN | 106157986 | A | 11/2016 |
| CN | 106486147 | A | 3/2017 |
| CN | 107026934 | A | 8/2017 |
| CN | 107534809 | A | 1/2018 |
| CN | 108200515 | A | 6/2018 |
| CN | 108831474 | A | 11/2018 |
| CN | 110246513 | B | 8/2021 |
| EP | 2680615 | A1 | 1/2014 |
| JP | 2005124090 | A | 5/2005 |
| JP | 2016133304 | A | 7/2016 |
| JP | 6312069 | B1 | 4/2018 |
| KR | 20050062266 | A | 6/2005 |
| WO | 2019130908 | A1 | 7/2019 |

* cited by examiner

STEREO SOUND PICKUP METHOD AND APPARATUS, TERMINAL DEVICE, AND COMPUTER-READABLE STORAGE MEDIUM

CROSS REFERENCE TO RELATED APPLICATIONS

This application is a national stage of International Application No. PCT/CN2021/071156, filed on Jan. 12, 2021, which claims priority to Chinese Patent Application No. 202010048851.9 filed on Jan. 16, 2020. Both of the aforementioned applications are hereby incorporated by reference in their entireties.

TECHNICAL FIELD

The present invention relates to the audio processing field, and in particular, to a stereo sound pickup method and apparatus, a terminal device, and a computer-readable storage medium.

BACKGROUND

With the development of terminal technologies, video recording has become an important application of a terminal device such as a mobile phone or a tablet computer, and a user has an increasingly high requirement on video recording effects.

Currently, when a terminal device is used to record a video, the terminal device cannot adapt to requirements of various scenarios because video recording scenarios are complex and changeable, impact of environmental noise exists during recording, and a direction of a stereo beam generated by the terminal device cannot be adjusted due to a fixed configuration parameter. Consequently, better stereo recording effects cannot be obtained.

SUMMARY

In view of this, an objective of the present invention is to provide a stereo sound pickup method and apparatus, a terminal device, and a computer-readable storage medium, so that the terminal device can obtain better stereo recording effects in different video recording scenarios.

To achieve the foregoing objective, embodiments of the present invention use the following technical solutions:

According to a first aspect, an embodiment of the present invention provides a stereo sound pickup method, applied to a terminal device, where the terminal device includes a plurality of microphones, and the method includes: obtaining a plurality of pieces of target sound pickup data from sound pickup data of the plurality of microphones; obtaining posture data and camera data of the terminal device; determining, from a plurality of prestored beam parameter groups based on the posture data and the camera data, a target beam parameter group corresponding to the plurality of pieces of target sound pickup data, where the target beam parameter group includes beam parameters respectively corresponding to the plurality of pieces of target sound pickup data; and forming a stereo beam based on the target beam parameter group and the plurality of pieces of target sound pickup data.

In the stereo sound pickup method provided in this embodiment of the present invention, because the target beam parameter group is determined based on the posture data and the camera data of the terminal device, when the terminal device is in different video recording scenarios, different posture data and camera data are obtained, so as to determine different target beam parameter groups. In this way, when the stereo beam is formed based on the target beam parameter group and the plurality of pieces of target sound pickup data, a direction of the stereo beam may be adjusted by using the different target beam parameter groups. This effectively reduces impact of noise in a recording environment, so that the terminal device can obtain better stereo recording effects in different video recording scenarios. In an optional implementation, the camera data includes enable data, and the enable data indicates an enabled camera.

The step of determining, from a plurality of prestored beam parameter groups based on the posture data and the camera data, a target beam parameter group corresponding to the plurality of pieces of target sound pickup data includes: determining, from the plurality of prestored beam parameter groups based on the posture data and the enable data, a first target beam parameter group corresponding to the plurality of pieces of target sound pickup data.

The step of forming a stereo beam based on the target beam parameter group and the plurality of pieces of target sound pickup data includes: forming a first stereo beam based on the first target beam parameter group and the plurality of pieces of target sound pickup data, where the first stereo beam points to a shooting direction of the enabled camera.

In this embodiment of the present invention, the first target beam parameter group is determined based on the posture data of the terminal device and the enable data indicating the enabled camera, and the first stereo beam is formed based on the first target beam parameter group and the plurality of pieces of target sound pickup data. Therefore, in different video recording scenarios, a direction of the first stereo beam is adaptively adjusted based on the posture data and the enable data, and this ensures that better stereo recording effects can be obtained when the terminal device records a video.

In an optional implementation, the plurality of beam parameter groups include a first beam parameter group, a second beam parameter group, a third beam parameter group, and a fourth beam parameter group, and beam parameters in the first beam parameter group, the second beam parameter group, the third beam parameter group, and the fourth beam parameter group are different.

When the posture data indicates that the terminal device is in a landscape mode, and the enable data indicates that a rear-facing camera is enabled, the first target beam parameter group is the first beam parameter group.

When the posture data indicates that the terminal device is in a landscape mode, and the enable data indicates that a front-facing camera is enabled, the first target beam parameter group is the second beam parameter group.

When the posture data indicates that the terminal device is in a portrait mode, and the enable data indicates that a rear-facing camera is enabled, the first target beam parameter group is the third beam parameter group.

When the posture data indicates that the terminal device is in a portrait mode, and the enable data indicates that a front-facing camera is enabled, the first target beam parameter group is the fourth beam parameter group.

In an optional implementation, the camera data includes enable data and zoom data. The zoom data is a zoom magnification of an enabled camera indicated by the enable data.

The step of determining, from a plurality of prestored beam parameter groups based on the posture data and the camera data, a target beam parameter group corresponding to the plurality of pieces of target sound pickup data includes: determining, from the plurality of prestored beam parameter groups based on the posture data, the enable data, and the zoom data, a second target beam parameter group corresponding to the plurality of pieces of target sound pickup data.

The step of forming a stereo beam based on the target beam parameter group and the plurality of pieces of target sound pickup data includes: forming a second stereo beam based on the second target beam parameter group and the plurality of pieces of target sound pickup data. The second stereo beam points to a shooting direction of the enabled camera, and a width of the second stereo beam narrows as the zoom magnification increases.

In this embodiment of the present invention, the second target beam parameter group is determined based on the posture data of the terminal device, the enable data indicating the enabled camera, and the zoom data, and the second stereo beam is formed based on the second target beam parameter group and the plurality of pieces of target sound pickup data. Therefore, in different video recording scenarios, a direction and a width of the second stereo beam are adaptively adjusted based on the posture data, the enable data, and the zoom data, so that better recording robustness can be implemented in a noisy environment and a long-distance sound pickup condition.

In an optional implementation, the step of obtaining a plurality of pieces of target sound pickup data from sound pickup data of the plurality of microphones includes: obtaining, based on the sound pickup data of the plurality of microphones, a sequence number of an unblocked microphone; detecting whether abnormal sound data exists in the sound pickup data of each microphone; if the abnormal sound data exists, eliminating the abnormal sound data in the sound pickup data of the plurality of microphones, to obtain initial target sound pickup data; and selecting, from the initial target sound pickup data, sound pickup data corresponding to the sequence number of the unblocked microphone as the plurality of pieces of target sound pickup data.

In this embodiment of the present invention, the plurality of pieces of target sound pickup data used to form the stereo beam are determined by performing microphone blocking detection on the plurality of microphones and performing abnormal sound processing on the sound pickup data of the plurality of microphones, so that better recording robustness is still implemented in a case of abnormal sound interference and microphone blocking, and good stereo recording effects are ensured.

In an optional implementation, the step of obtaining, based on the sound pickup data of the plurality of microphones, a sequence number of an unblocked microphone includes: performing time domain framing processing and frequency domain transformation processing on the sound pickup data of each microphone, to obtain time domain information and frequency domain information that correspond to the sound pickup data of each microphone; separately comparing time domain information and frequency domain information that correspond to sound pickup data of different microphones, to obtain a time domain comparison result and a frequency domain comparison result; determining, based on the time domain comparison result and the frequency domain comparison result, a sequence number of a blocked microphone; and determining, based on the sequence number of the blocked microphone, the sequence number of the unblocked microphone.

In this embodiment of the present invention, the time domain information and the frequency domain information that correspond to sound pickup data of different microphones are compared, so that an accurate microphone blocking detection result can be obtained. This helps subsequently determine a plurality of pieces of target sound pickup data used to form a stereo beam, and ensures good stereo recording effects.

In an optional implementation, the step of detecting whether abnormal sound data exists in the sound pickup data of each microphone includes: performing frequency domain transformation processing on the sound pickup data of each microphone to obtain frequency domain information corresponding to the sound pickup data of each microphone; and detecting, based on a pre-trained abnormal sound detection network and the frequency domain information corresponding to the sound pickup data of each microphone, whether the abnormal sound data exists in the sound pickup data of each microphone.

In this embodiment of the present invention, the frequency domain transformation processing is performed on the sound pickup data of the microphone, and whether abnormal sound data exists in the sound pickup data of the microphone is detected by using the pre-trained abnormal sound detection network and the frequency domain information corresponding to the sound pickup data of the microphone, so as to subsequently obtain clean sound pickup data, thereby ensuring good stereo recording effects.

In an optional implementation, the step of eliminating the abnormal sound data in the sound pickup data of the plurality of microphones includes: detecting, by using a pre-trained sound detection network, whether preset sound data exists in the abnormal sound data; and if the preset sound data does not exist, eliminating the abnormal sound data; or if the preset sound data exists, reducing an intensity of the abnormal sound data.

In this embodiment of the present invention, when elimination processing is performed on an abnormal sound, whether the preset sound data exists in the abnormal sound data is detected, and different elimination measures are taken based on a detection result. This can not only ensure that clean sound pickup data is obtained, but also prevent sound data that a user expects to record from being completely eliminated.

In an optional implementation, the step of obtaining a plurality of pieces of target sound pickup data from sound pickup data of the plurality of microphones includes: obtaining, based on the sound pickup data of the plurality of microphones, a sequence number of an unblocked microphone; and selecting, from the sound pickup data of the plurality of microphones, sound pickup data corresponding to the sequence number of the unblocked microphone as the plurality of pieces of target sound pickup data.

In this embodiment of the present invention, microphone blocking detection is performed on the plurality of microphones, and the sound pickup data corresponding to the sequence number of the unblocked microphone is selected to subsequently form a stereo beam, so that when the terminal device records a video, sound quality is not significantly reduced or stereo is not significantly unbalanced due to microphone blocking, that is, when a microphone is blocked, stereo recording effects can be ensured, and recording robustness is good.

In an optional implementation, the step of obtaining a plurality of pieces of target sound pickup data from sound pickup data of the plurality of microphones includes: detecting whether abnormal sound data exists in the sound pickup data of each microphone; and if the abnormal sound data exists, eliminating the abnormal sound data in the sound pickup data of the plurality of microphones, to obtain the plurality of pieces of target sound pickup data.

In this embodiment of the present invention, abnormal sound detection and abnormal sound elimination processing are performed on the sound pickup data of the plurality of microphones, so that clean sound pickup data can be obtained for subsequently forming a stereo beam. In this way, when the terminal device records a video, impact of the abnormal sound data on stereo recording effects is effectively reduced. In an optional implementation, after the step of forming a stereo beam based on the target beam parameter group and the plurality of pieces of target sound pickup data, the method further includes: correcting a timbre of the stereo beam.

In this embodiment of the present invention, by correcting the timbre of the stereo beam, a frequency response may be corrected to be straight, so as to obtain better stereo recording effects.

In an optional implementation, after the step of forming a stereo beam based on the target beam parameter group and the plurality of pieces of target sound pickup data, the method further includes: adjusting a gain of the stereo beam.

In this embodiment of the present invention, by adjusting the gain of the stereo beam, sound pickup data of low volume can be heard clearly, and clipping distortion does not occur on sound pickup data of high volume, so that a sound recorded by a user is adjusted to proper volume. This improves video recording experience of the user.

In an optional implementation, the camera data includes the zoom magnification of the enabled camera, and the step of adjusting a gain of the stereo beam includes: adjusting the gain of the stereo beam based on the zoom magnification of the camera.

In this embodiment of the present invention, the gain of the stereo beam is adjusted based on the zoom magnification of the camera, so that volume of a target sound source does not decrease due to a long distance. This improves sound effects of video recording.

In an optional implementation, a quantity of the microphones is 3 to 6, and at least one microphone is disposed on the front of a screen of the terminal device or on the back of the terminal device.

In this embodiment of the present invention, at least one microphone is disposed on the front of the screen of the terminal device or on the back of the terminal device, so as to ensure that a stereo beam pointing to front and rear directions of the terminal device can be formed.

In an optional implementation, the quantity of the microphones is 3, one microphone is disposed on each of the top and the bottom of the terminal device, and one microphone is disposed on the front of the screen of the terminal device or on the back of the terminal device.

In an optional implementation, the quantity of the microphones is 6, two microphones are disposed on each of the top and the bottom of the terminal device, and one microphone is disposed on each of the front of the screen of the terminal device and the back of the terminal device.

According to a second aspect, an embodiment of the present invention provides a stereo sound pickup apparatus, applied to a terminal device, where the terminal device includes a plurality of microphones, and the apparatus includes: a sound pickup data obtaining module, configured to obtain a plurality of pieces of target sound pickup data from sound pickup data of the plurality of microphones; a device parameter obtaining module, configured to obtain posture data and camera data of the terminal device; a beam parameter determining module, configured to determine, from a plurality of prestored beam parameter groups based on the posture data and the camera data, a target beam parameter group corresponding to the plurality of pieces of target sound pickup data, where the target beam parameter group includes beam parameters respectively corresponding to the plurality of pieces of target sound pickup data; and a beam formation module, configured to form a stereo beam based on the target beam parameter group and the plurality of pieces of target sound pickup data.

According to a third aspect, an embodiment of the present invention provides a terminal device, including a memory that stores a computer program and a processor. When the computer program is read and run by the processor, the method according to any one of the foregoing implementations is implemented.

According to a fourth aspect, an embodiment of the present invention provides a computer-readable storage medium. The computer-readable storage medium stores a computer program, and when the computer program is read and run by a processor, the method according to any one of the foregoing implementations is implemented.

According to a fifth aspect, an embodiment of the present invention further provides a computer program product. When the computer program product runs on a computer, the computer is enabled to perform the method according to any one of the foregoing implementations.

According to a sixth aspect, an embodiment of the present invention further provides a chip system. The chip system includes a processor, and may further include a memory, configured to implement the method according to any one of the foregoing implementations. The chip system may include a chip, or may include a chip and another discrete component.

To make the objectives, features, and advantages of the present invention clearer and more comprehensible, the following gives a detailed description with reference to embodiments and the accompanying drawings.

BRIEF DESCRIPTION OF THE DRAWINGS

To describe the technical solutions in embodiments of the present invention more clearly, the following briefly describes the accompanying drawings used for describing embodiments. It should be understood that the accompanying drawings show only some embodiments of the present invention, and therefore should not be considered as a limitation on the scope. Persons of ordinary skill in the art may still derive other related drawings from these accompanying drawings without creative efforts.

DETAILED DESCRIPTION OF ILLUSTRATIVE EMBODIMENTS

The following clearly describes the technical solutions in embodiments of the present invention with reference to the accompanying drawings in embodiments of the present invention. It is clearly that the described embodiments are merely a part rather than all of embodiments of the present invention. Generally, components of embodiments of the present invention described and shown in the accompanying drawings herein may be arranged and designed in various configurations.

Therefore, the following detailed descriptions of embodiments of the present invention provided in the accompanying drawings are not intended to limit the scope of the present invention that claims protection, but merely to represent selected embodiments of the present invention. All other embodiments obtained by persons skilled in the art based on embodiments of the present invention without creative efforts shall fall within the protection scope of the present invention.

It should be noted that relational terms such as "first" and "second" are only used to distinguish one entity or operation from another, and do not necessarily require or imply that any actual relationship or sequence exists between these entities or operations. Moreover, the terms "include", "contain", or any other variant is intended to cover a non-exclusive inclusion, so that a process, a method, an article, or a device that includes a list of elements not only includes those elements but also includes other elements that are not expressly listed, or further includes elements inherent to such a process, method, article, or device. An element preceded by "includes a . . . " does not, without more constraints, preclude the presence of additional identical elements in the process, method, article, or device that includes the element.

Figure 1:
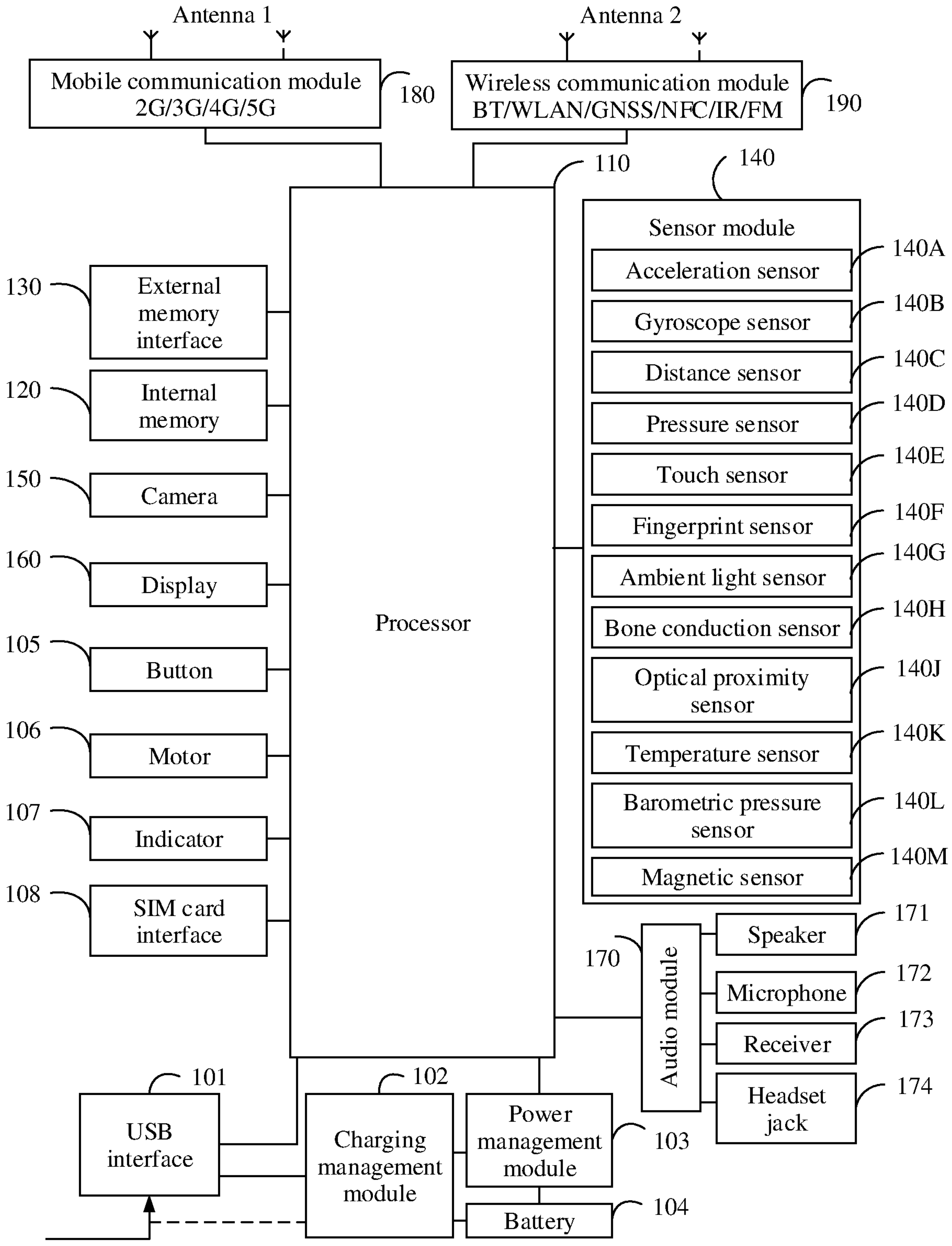
FIG. 1 is a schematic diagram of a hardware structure of a terminal device according to an embodiment of the present invention.

The stereo sound pickup method and apparatus provided in embodiments of the present invention may be applied to a terminal device such as a mobile phone or a tablet computer. For example, FIG. 1 is a schematic diagram of a hardware structure of a terminal device. The terminal device may include a processor no, an internal memory 120, an external memory interface 130, a sensor module 140, a camera 150, a display 160, an audio module 170, a speaker 171, a microphone 172, a receiver 173, a headset jack 174, a mobile communication module 180, a wireless communication module 190, a USB (Universal Serial Bus, universal serial bus) interface 101, a charging management module 102, a power management module 103, a battery 104, a button 105, a motor 106, an indicator 107, a subscriber identification module (Subscriber Identification Module, SIM) card interface 108, and an antenna 1, an antenna 2, and the like.

It should be understood that the hardware structure shown in FIG. 1 is merely an example. The terminal device in embodiments of the present invention may include more or fewer components than the terminal device shown in FIG. 1, may combine two or more components, or may have different component configurations. Various components shown in FIG. 1 may be implemented in hardware including one or more signal processing and/or application-specific integrated circuits, software, or a combination of hardware and software.

The processor no may include one or more processing units. For example, the processor no may include an application processor (Application Processor, AP), a modem processor, a graphics processing unit (Graphics Processing Unit, GPU), an image signal processor (Image Signal Processor, ISP), a controller, a memory, a video codec, a digital signal processor (Digital Signal Processor, DSP), a baseband processor, a neural-network processing unit (Neural-network Processing Unit, NPU), and/or the like. Different processing units may be independent components, or may be integrated into one or more processors. The controller may be a nerve center and a command center of the terminal device. The controller may generate an operation control signal based on instruction operation code and a time sequence signal, to complete control of instruction fetching and instruction execution.

The memory may be disposed in the processor no, and is configured to store instructions and data. In some embodiments, the memory in the processor no is a cache. The memory may store instructions or data just used or cyclically used by the processor no. If the processor no needs to use the instructions or data again, the processor no may directly invoke the instructions or data from the memory, to avoid repeated access and reduce waiting time of the processor no, thereby improving system efficiency.

The internal memory 120 may be configured to store a computer program and/or data. In some embodiments, the internal memory 120 may include a program storage area and a data storage area. The program storage area may store an operating system, an application required by at least one function (for example, a sound playback function, an image playback function, or a facial recognition function), and the like. The data storage area may store data (for example, audio data or image data) created during use of the terminal device, and the like. For example, the processor no may run the computer program and/or data stored in the internal memory 120, to execute various function applications and data processing of the terminal device. For example, when the computer program and/or data stored in the internal memory 120 are/is read and run by the processor no, the terminal device may perform a stereo sound pickup method provided in embodiments of the present invention, so that the terminal device can obtain better stereo recording effects in different video recording scenarios. In addition, the internal memory 120 may include a high-speed random access memory, and may further include a nonvolatile memory. For example, the nonvolatile memory may include at least one magnetic disk storage device, a flash memory device, a universal flash storage (Universal Flash Storage, UFS), and the like.

The external memory interface 130 may be configured to connect to an external storage card, for example, a micro SD card, to extend a storage capability of the terminal device. The external storage card communicates with the processor no through the external memory interface 130, to implement a data storage function. For example, a file such as music or a video is stored in the external storage card.

The sensor module 140 may include one or more sensors, for example, an acceleration sensor 140A, a gyroscope sensor 140B, a distance sensor 140C, a pressure sensor 140D, a touch sensor 140E, a fingerprint sensor 140F, an ambient light sensor 140G, a bone conduction sensor 140H, an optical proximity sensor 140J, a temperature sensor 140K, a barometric pressure sensor 140L, or a magnetic sensor 140M. This is not limited herein.

The acceleration sensor 140A can sense a change of an acceleration force, for example, various movement changes such as shaking, dropping, rising, and falling, and a change of an angle at which the terminal device is held, and the changes can be converted into an electrical signal by the acceleration sensor 140A. In this embodiment, the acceleration sensor 140A may detect whether the terminal device is in a landscape mode or a portrait mode.

The gyroscope sensor 140B may be configured to determine a motion posture of the terminal device. In some embodiments, angular velocities of the terminal device around three axes (that is, x, y, and z axes) may be determined by using the gyroscope sensor 140B. The gyroscope sensor 140B may be configured to implement image stabilization during shooting. For example, when the shutter is pressed, the gyroscope sensor 140B detects a shake angle of the terminal device, calculates, based on the angle, a distance that needs to be compensated by a lens module, and enables the lens to counteract the shake of the terminal device by performing reverse motion, thereby implementing image stabilization. The gyroscope sensor 140B may be further used in navigation and motion sensing game scenarios.

The distance sensor 140C may be configured to measure a distance. The terminal device may measure a distance by using infrared light or a laser. For example, in a shooting scenario, the terminal device may measure a distance by using the distance sensor 140C, to implement fast focusing.

The pressure sensor 140D may be configured to sense a pressure signal, and convert the pressure signal into an electrical signal. In some embodiments, the pressure sensor 140D may be disposed on the display 160. There are many types of pressure sensors 140D, for example, a resistive pressure sensor, an inductive pressure sensor, and a capacitive pressure sensor. The capacitive pressure sensor may include at least two parallel plates made of conductive materials. When a force is applied to the pressure sensor 140D, capacitance between electrodes changes, and the terminal device determines strength of the pressure based on the capacitance change. When a touch operation acts on the display 160, the terminal device may detect strength of the touch operation by using the pressure sensor 140D, or may calculate a touch location based on a detection signal of the pressure sensor 140D.

The touch sensor 140E is also referred to as a "touch panel". The touch sensor 140E may be disposed on the display 160, and the touch sensor 140E and the display 160 form a touchscreen, which is also referred to as a "touch screen". The touch sensor 140E is configured to detect a touch operation performed on or near the touch sensor 140E. The touch sensor 140E may transfer the detected touch operation to the application processor, to determine a type of a touch event, and provide a visual output related to the touch operation through the display 160. In some other embodiments, the touch sensor 140E may alternatively be disposed on a surface of the terminal device in a position different from that of the display 160.

The fingerprint sensor 140F may be configured to collect a fingerprint. The terminal device may use a feature of the collected fingerprint to implement fingerprint-based unlocking, application lock access, fingerprint-based photographing, fingerprint-based call answering, and the like.

The ambient light sensor 140G may be configured to sense ambient light brightness. The terminal device may adaptively adjust brightness of the display 160 based on the sensed ambient light brightness. The ambient light sensor 140G may also be configured to automatically adjust white balance during photographing. The ambient light sensor 140G may further cooperate with the optical proximity sensor 140J to detect whether the terminal device is in a pocket, to prevent an accidental touch. The bone conduction sensor 140H may be configured to obtain a vibration signal. In some embodiments, the bone conduction sensor 140H may obtain a vibration signal of a vibration bone of a human vocal-cord part. The bone conduction sensor 140H may also be in contact with a body pulse to receive a blood pressure beating signal. In some embodiments, the bone conduction sensor 140H may also be disposed in a headset, to obtain a bone conduction headset. The audio module 170 may obtain a voice signal through parsing based on the vibration signal that is of the vibration bone of the vocal-cord part and that is obtained by the bone conduction sensor 140H, to implement a voice function. The application processor may parse heart rate information based on the blood pressure beating signal obtained by the bone conduction sensor 140H, to implement a heart rate detection function.

The optical proximity sensor 140J may include, for example, a light emitting diode (LED) and an optical detector such as a photodiode. The light emitting diode may be an infrared light emitting diode. The terminal device emits infrared light outwards by using the light emitting diode. The terminal device detects infrared reflected light from a nearby object by using the photodiode. When adequate reflected light is detected, the terminal device may determine that there is an object near the terminal device. When inadequate reflected light is detected, the terminal device may determine that there is no object near the terminal device. The terminal device may detect, by using the optical proximity sensor 140J, that a user holds the terminal device close to an ear for a call, so that the terminal device automatically turns off the screen to save power.

The temperature sensor 140K may be configured to detect a temperature. In some embodiments, the terminal device executes a temperature processing policy by using the temperature detected by the temperature sensor 140K. For example, when the temperature reported by the temperature sensor 140K exceeds a threshold, the terminal device lowers performance of a processor located near the temperature sensor 140K, to reduce power consumption and implement thermal protection. In some other embodiments, when the temperature is lower than another threshold, the terminal device heats the battery 104, to avoid abnormal shutdown of the terminal device caused by a low temperature. In some other embodiments, when the temperature is lower than still another threshold, the terminal device boosts an output voltage of the battery 104, to avoid abnormal shutdown caused by a low temperature.

The barometric pressure sensor 140L may be configured to measure barometric pressure. In some embodiments, the terminal device calculates an altitude by using a barometric pressure value measured by the barometric pressure sensor 140L, to assist in positioning and navigation.

The magnetic sensor 140M may include a Hall effect sensor. The terminal device may detect opening and closing of a flip cover by using the magnetic sensor 140M. In some embodiments, when the terminal device is a flip phone, the terminal device may detect, by using the magnetic sensor 140M, whether a flip cover is opened or closed, and further set, based on a detected opened or closed state of the flip cover, a feature such as automatic unlocking of the flip cover.

The camera 150 is configured to capture an image or a video. An optical image of an object is generated by using a lens and is projected to a photosensitive element. The photosensitive element may be a charge coupled device (Charge Coupled Device, CCD) or a complementary metal-oxide-semiconductor (Complementary Metal-Oxide-Semiconductor, CMOS) photoelectric transistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the terminal device may include one or more cameras 150. This is not limited herein. In an example, the terminal device includes two cameras 150, for example, one front-facing camera and one rear-facing camera. In another example, the terminal device includes five cameras 150, for example, three rear-facing cameras and two front-facing cameras. The terminal device can implement a photographing function by using the ISP, the camera 150, the video codec, the GPU, the display 160, the application processor, and the like.

The display 160 is configured to display an image, a video, and the like. The display 160 includes a display panel. The display panel may use a liquid crystal display (Liquid Crystal Display, LCD), an organic light-emitting diode (Organic Light-Emitting Diode, OLED), an active-matrix organic light emitting diode (Active-Matrix Organic Light Emitting Diode, AMOLED), a flexible light-emitting diode (Flexible Light-Emitting Diode, FLED), a mini LED, a micro LED, a micro OLED, a quantum dot light emitting diode (Quantum Dot Light Emitting Diode, QLED), or the like. For example, the terminal device may implement a display function by using the GPU, the display 160, the application processor, and the like.

In this embodiment, the terminal device may implement an audio function such as audio playback and recording by using the audio module 170, the speaker 171, the microphone 172, the receiver 173, the headset jack 174, the application processor, and the like.

The audio module 170 is configured to convert digital audio information into an analog audio signal output, and is also configured to convert an analog audio input into a digital audio signal. The audio module 170 may be further configured to code and decode an audio signal. In some embodiments, the audio module 170 may be disposed in the processor no, or some function modules in the audio module 170 are disposed in the processor no.

The speaker 171, also referred to as a "loudspeaker", is configured to convert an audio electrical signal into a sound signal. For example, the terminal device may play music, send a voice prompt, or the like by using the speaker 171.

The microphone 172, also referred to as a "mike" or a "mic", is configured to capture a sound (for example, an ambient sound, including a sound made by a person or a sound made by a device), and convert a sound signal into an audio electrical signal, that is, sound pickup data in this embodiment. It should be noted that a plurality of microphones 172 may be disposed on the terminal device, and the plurality of microphones 172 are disposed on the terminal device, so that the user can obtain high-quality stereo recording effects when recording a video by using the terminal device.

In this embodiment, a quantity of microphones 172 disposed on the terminal device may be 3 to 6, at least one microphone 172 is disposed on the front of the screen of the terminal device or on the back of the terminal device, so as to ensure that a stereo beam pointing to front and rear directions of the terminal device can be formed.

Figure 2:
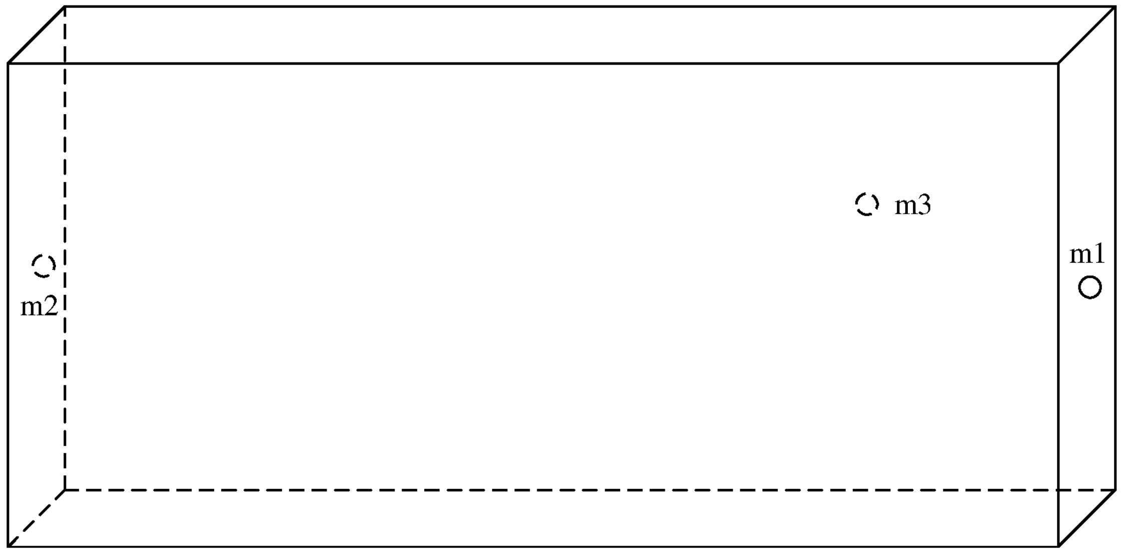
FIG. 2 is a schematic diagram of a layout when a quantity of microphones on a terminal device is 3 according to an embodiment of the present invention.
Figure 3:
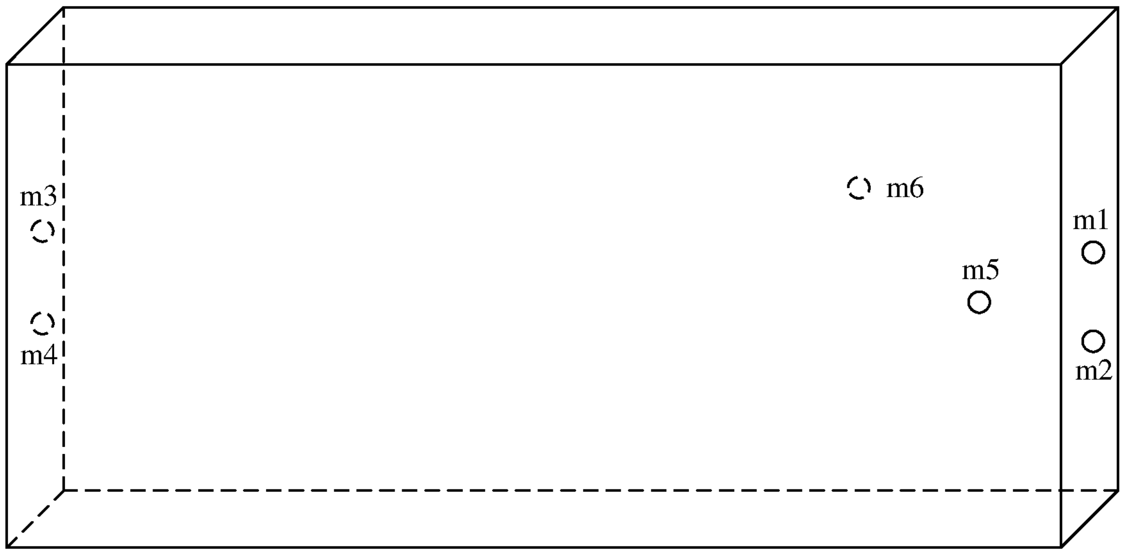
FIG. 3 is a schematic diagram of a layout when a quantity of microphones on a terminal device is 6 according to an embodiment of the present invention.

For example, as shown in FIG. 2, when the quantity of microphones is 3, one microphone is disposed on each of the top and the bottom of the terminal device (that is, m1 and m2), and one microphone is disposed on the front of the screen of the terminal device or on the back of the terminal device (that is, m3). As shown in FIG. 3, when the quantity of microphones is 6, two microphones are disposed on each of the top and the bottom of the terminal device (that is, m1 and m2, and m3 and m4), and one microphone is disposed on each of the front of the screen of the terminal device and the back of the terminal device (that is, m5 and m6). It may be understood that, in another embodiment, the quantity of the microphones 172 may alternatively be 4 or 5, and at least one microphone 172 is disposed on the front of the screen of the terminal device or on the back of the terminal device.

The receiver 173, also referred to as an "earpiece", is configured to convert an audio electrical signal into a sound signal. When the terminal device is used to answer a call or listen to voice information, the receiver 173 may be placed close to a human ear to listen to a voice.

The headset jack 174 is configured to connect to a wired headset. The headset jack 174 may be a USB interface, or may be a 3.5 mm open mobile terminal platform (Open Mobile Terminal Platform, OMTP) standard interface or a cellular telecommunications industry association of the USA (Cellular Telecommunications Industry Association of the USA, CTIA) standard interface.

A wireless communication function of the terminal device may be implemented through the antenna 1, the antenna 2, the mobile communication module 180, the wireless communication module 190, the modem processor, the baseband processor, and the like.

The antenna 1 and the antenna 2 are configured to transmit and receive an electromagnetic wave signal. Each antenna in the terminal device may be configured to cover one or more communication frequency bands. Different antennas may be further multiplexed, to improve antenna utilization. For example, the antenna 1 may be multiplexed as a diversity antenna of a wireless local area network. In some other embodiments, an antenna may be used in combination with a tuning switch.

The mobile communication module 180 may provide a wireless communication solution used in the terminal device and including wireless communication of 2G, 3G, 4G, 5G, and the like. The mobile communication module 180 may include at least one filter, a switch, a power amplifier, a low noise amplifier (Low Noise Amplifier, LNA), and the like. The mobile communication module 180 may receive an electromagnetic wave through the antenna 1, perform processing such as filtering or amplification on the received electromagnetic wave, and transfer the electromagnetic wave to the modem processor for demodulation. The mobile communication module 180 may further amplify a signal modulated by the modem processor, and convert the signal into an electromagnetic wave for radiation through the antenna 1. In some embodiments, at least some function modules in the mobile communication module 180 may be disposed in the processor no. In some other embodiments, at least some function modules in the mobile communication module 180 may be disposed in a same device as at least some modules in the processor 110.

The modem processor may include a modulator and a demodulator. The modulator is configured to modulate a to-be-sent low-frequency baseband signal into a medium and high frequency signal, and the demodulator is configured to demodulate a received electromagnetic wave signal into a low-frequency baseband signal. Then, the demodulator transmits the low-frequency baseband signal obtained through demodulation to the baseband processor for processing. The baseband processor processes the low-frequency baseband signal, and then transmits a processed signal to the application processor. The application processor outputs a sound signal through an audio device (which is not limited to the speaker 171, the receiver 173, or the like), or displays an image or a video through the display 160. In some embodiments, the modem processor may be an independent component. In some other embodiments, the modem processor may be independent of the processor no, and is disposed in a same device as the mobile communication module 180 or another function module.

The wireless communication module 190 may provide a wireless communication solution that includes a wireless local area network (Wireless Local Area Network, WLAN) (such as a wireless fidelity (Wireless Fidelity, Wi-Fi) network), Bluetooth (BitTorrent, BT), a global navigation satellite system (Global Navigation Satellite System, GNSS), frequency modulation (Frequency Modulation, FM), a near field communication (Near Field Communication, NFC) technology, and an infrared (Infrared Radiation, IR) technology and that is applied to the terminal device. The wireless communication module 190 may be one or more components integrating at least one communication processing module. The wireless communication module 190 receives an electromagnetic wave through the antenna 2, performs frequency modulation and filtering processing on an electromagnetic wave signal, and sends a processed signal to the processor 110. The wireless communication module 190 may further receive a to-be-sent signal from the processor 110, perform frequency modulation and amplification on the signal, and convert the signal into an electromagnetic wave for radiation through the antenna 2.

In some embodiments, the antenna 1 of the terminal device is coupled to the mobile communication module 180, and the antenna 2 is coupled to the wireless communication module 190, so that the terminal device may communicate with a network and another device by using a wireless communication technology. The wireless communication technology may include a global system for mobile communication (Global System For Mobile Communication, GSM), a general packet radio service (General Packet Radio Service, GPRS), code division multiple access (Code Division Multiple Access, CDMA), wideband code division multiple access (Wideband Code Division Multiple Access, WCDMA), time division-synchronous code division multiple access (Time Division-Synchronous Code Division Multiple Access, TD-SCDMA), long term evolution (Long Term Evolution, LTE), BT, a GNSS, a WLAN, NFC, FM, an IR technology, and/or the like. The GNSS may include a global positioning system (Global Positioning System, GPS), a global navigation satellite system (Global Navigation Satellite System, GLONASS), a BeiDou navigation satellite system (BeiDou Navigation Satellite System, BDS), a quasi-zenith satellite system (Quasi-Zenith Satellite System, QZSS), and/or a satellite based augmentation system (Satellite Based Augmentation System, SBAS).

The USB interface 101 is an interface that conforms to a USB standard specification, and may be specifically a mini USB interface, a micro USB interface, a USB Type C interface, or the like. The USB interface 101 may be configured to connect to the charger to charge the terminal device, or may be configured to transmit data between the terminal device and a peripheral device, or may be configured to connect to a headset for playing audio by using the headset. For example, in addition to the headset jack 174, the USB interface 101 may be further configured to connect to another terminal device, for example, an AR (Augmented Reality, augmented reality) device or a computer.

The charging management module 102 is configured to receive a charging input from the charger. The charger may be a wireless charger or a wired charger. In some embodiments of wired charging, the charging management module 102 may receive a charging input of a wired charger through the USB interface 101. In some embodiments of wireless charging, the charging management module 102 may receive a wireless charging input through a wireless charging coil of the terminal device. When charging the battery 104, the charging management module 102 may further supply power to the terminal device by using the power management module 103.

The power management module 103 is configured to connect to the battery 104, the charging management module 102, and the processor 110. The power management module 103 receives an input from the battery 104 and/or an input from the charging management module 102, and supplies power to the processor 110, the internal memory 120, the camera 150, the display 160, and the like. The power management module 103 may be further configured to monitor parameters such as a battery capacity, a battery cycle count, and a battery health status (electric leakage or impedance). In some embodiments, the power management module 103 may be disposed in the processor 110. In some other embodiments, the power management module 103 and the charging management module 102 may alternatively be disposed in a same device.

The button 105 includes a power button, a volume button, and the like. The button 105 may be a mechanical button, or may be a touch button. The terminal device may receive a button input, and generate a button signal input related to a user setting and function control of the terminal device.

The motor 106 may generate a vibration prompt. The motor 106 may be configured to provide an incoming call vibration prompt and a touch vibration feedback. For example, touch operations performed on different applications (for example, a photographing application and an audio playing application) may correspond to different vibration feedback effects. The motor 106 may also correspond to different vibration feedback effects for touch operations performed on different areas of the display 160. Different application scenarios (for example, time reminding, information receiving, an alarm clock, and a game) may also correspond to different vibration feedback effects. A touch vibration feedback effect may be further customized.

The indicator 107 may be an indicator light, and may be configured to indicate a charging status and a power change, or may be configured to indicate a message, a missed call, a notification, and the like.

The SIM card interface 108 is configured to connect to a SIM card. The SIM card may be inserted into the SIM card interface 108 or removed from the SIM card interface 108, to implement contact with or separation from the terminal device. The terminal device may support one or more SIM card interfaces. The SIM card interface 108 may support a nano-SIM card, a micro-SIM card, a SIM card, and the like. A plurality of cards may be inserted into a same SIM card interface 108 at the same time. The plurality of cards may be of a same type or different types. The SIM card interface 108 is also compatible with different types of SIM cards. The SIM card interface 108 is also compatible with the external storage card. The terminal device interacts with a network by using the SIM card, to implement functions such as a call and data communication. In some embodiments, the terminal device uses an eSIM, that is, an embedded SIM card. The eSIM card may be embedded in the terminal device, and cannot be separated from the terminal device.

According to a stereo sound pickup method provided in an embodiment of the present invention, a target beam parameter group is determined based on posture data and camera data of a terminal device, and a stereo beam is formed based on target sound pickup data picked up by a microphone. Different target beam parameter groups are determined based on different posture data and camera data. Therefore, a direction of the stereo beam may be adjusted based on different target beam parameter groups. Therefore, impact of noise in a recording environment can be effectively reduced, so that the terminal device can obtain better stereo recording effects in different video recording scenarios. In addition, by detecting a hole blocking condition of the microphone, eliminating various abnormal sound data, correcting a timbre of the stereo beam, and adjusting a gain of the stereo beam, robustness of recording is further enhanced while good stereo recording effects are ensured.

Figure 4:
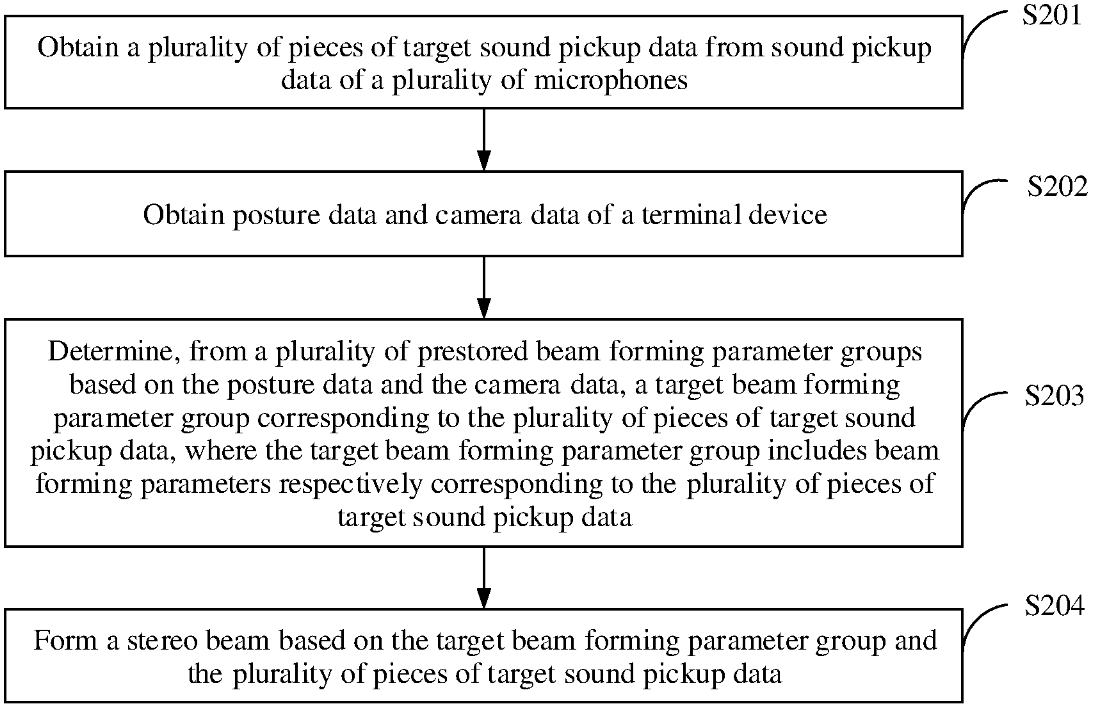
FIG. 4 is a schematic flowchart of a stereo sound pickup method according to an embodiment of the present invention.

FIG. 4 is a schematic flowchart of a stereo sound pickup method according to an embodiment of the present invention. The stereo sound pickup method may be implemented on a terminal device having the foregoing hardware structure. Refer to FIG. 4. The stereo sound pickup method may include the following steps.

S201: Obtain a plurality of pieces of target sound pickup data from sound pickup data of a plurality of microphones.

In this embodiment, when a user uses a terminal device to take a photo or record a video, the terminal device may capture a sound by using a plurality of microphones disposed on the terminal device, and then obtain a plurality of pieces of target sound pickup data from sound pickup data of the plurality of microphones.

The plurality of pieces of target sound pickup data may be directly obtained based on the sound pickup data of the plurality of microphones, or may be obtained by selecting sound pickup data of some of the plurality of microphones according to a specific rule, or may be obtained after the sound pickup data of the plurality of microphones is processed in a specific manner. This is not limited.

S202: Obtain posture data and camera data of the terminal device.

In this embodiment, the posture data of the terminal device may be obtained by using the acceleration sensor 140A. The posture data may indicate that the terminal device is in a landscape mode or a portrait mode. The camera data may be understood as usage corresponding to a camera disposed on the terminal device in a process in which the user uses the terminal device to record a video.

S203: Determine, from a plurality of prestored beam parameter groups based on the posture data and the camera data, a target beam parameter group corresponding to the plurality of pieces of target sound pickup data, where the target beam parameter group includes beam parameters respectively corresponding to the plurality of pieces of target sound pickup data.

In this embodiment, the beam parameter group may be obtained through pre-training and stored in the terminal device, and includes several parameters that affect stereo beam formation. In an example, for a possible video recording scenario of the terminal device, posture data and camera data that correspond to the terminal device may be determined in advance, and a matched beam parameter group is set based on the posture data and the camera data. In this way, a plurality of beam parameter groups may be obtained, respectively corresponding to different video recording scenarios, and the plurality of beam parameter groups are stored in the terminal device for subsequent video recording. For example, when the user uses the terminal device to take a photo or record a video, the terminal device may determine a matched target beam parameter group from the plurality of beam parameter groups based on currently obtained posture data and camera data.

It may be understood that, when the terminal device is in different video recording scenarios, posture data and camera data that correspond to the terminal device change correspondingly. Therefore, different target beam parameter groups may be determined from the plurality of beam parameter groups based on the posture data and the camera data. In other words, the beam parameters respectively corresponding to the plurality of pieces of target sound pickup data vary with different video recording scenarios.

S204: Form a stereo beam based on the target beam parameter group and the plurality of pieces of target sound pickup data.

In this embodiment, the beam parameter in the target beam parameter group may be understood as a weight value. When the stereo beam is formed based on the target beam parameter group and the plurality of pieces of target sound pickup data, a weighted sum operation may be performed by using each piece of target sound pickup data and a corresponding weight value, to finally obtain the stereo beam.

Because the stereo beam has spatial directivity, beam forming processing is performed on the plurality of pieces of target sound pickup data, so that different degrees of suppression can be implemented on sound pickup data outside a spatial direction to which the stereo beam points, to effectively reduce impact of noise in a recording environment. In addition, because the beam parameters respectively corresponding to the plurality of pieces of target sound pickup data vary with different video recording scenarios, a direction of the stereo beam formed based on the target beam parameter group and the plurality of pieces of target sound pickup data also varies with the video recording scenario, so that the terminal device can obtain better stereo recording effects in different video recording scenarios.

Figure 5:
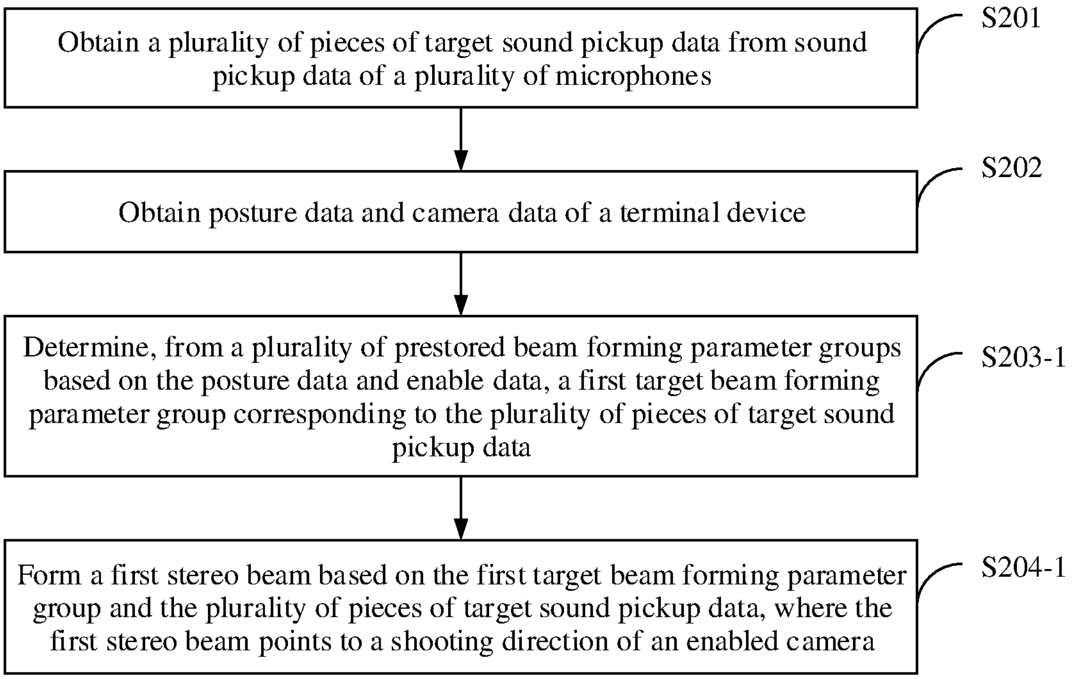
FIG. 5 is another schematic flowchart of a stereo sound pickup method according to an embodiment of the present invention.

In some embodiments, when recording a video by using the terminal device, the user selects different cameras for shooting based on different recording scenarios, and may further adjust a posture of the terminal device to make the terminal device be in the landscape mode or the portrait mode. In this case, the camera data of the terminal device may include enable data, and the enable data indicates an enabled camera. As shown in FIG. 5, step S203 may include substep S203-1 of determining, from the plurality of prestored beam parameter groups based on the posture data and the enable data, a first target beam parameter group corresponding to the plurality of pieces of target sound pickup data. Step S204 may include substep S204-1 of forming a first stereo beam based on the first target beam parameter group and the plurality of pieces of target sound pickup data, where the first stereo beam points to a shooting direction of the enabled camera.

In actual application, when the terminal device is in different video recording scenarios, the terminal device needs to correspond to different beam parameter groups. Therefore, the terminal device may prestore a plurality of beam parameter groups. In an example, the plurality of beam parameter groups may include a first beam parameter group, a second beam parameter group, a third beam parameter group, and a fourth beam parameter group, and beam parameters in the first beam parameter group, the second beam parameter group, the third beam parameter group, and the fourth beam parameter group are different.

For example, the video recording scenario includes the landscape mode and the portrait mode of the terminal device and usage of a front-facing camera and a rear-facing camera. When the posture data indicates that the terminal device is in the landscape mode, and the enable data indicates that the rear-facing camera is enabled, the first target beam parameter group is the first beam parameter group. When the posture data indicates that the terminal device is in the landscape mode, and the enable data indicates that the front-facing camera is enabled, the first target beam parameter group is the second beam parameter group. When the posture data indicates that the terminal device is in the portrait mode, and the enable data indicates that the rear-facing camera is enabled, the first target beam parameter group is the third beam parameter group. When the posture data indicates that the terminal device is in the portrait mode, and the enable data indicates that the front-facing camera is enabled, the first target beam parameter group is the fourth beam parameter group.

Figure 6:
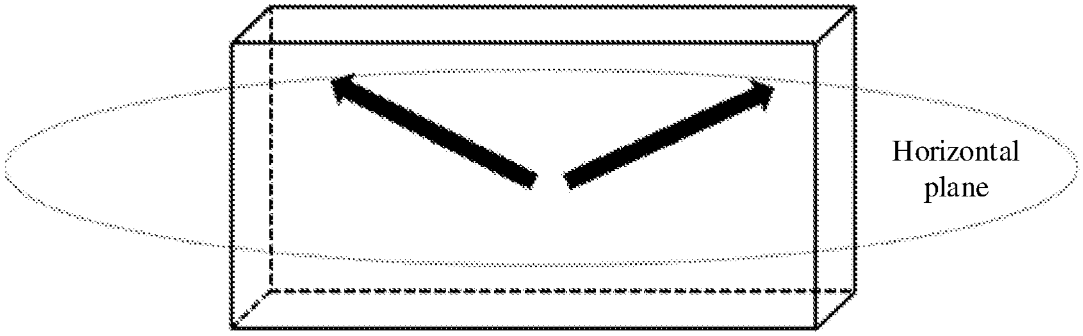
FIG. 6 is a schematic diagram of a corresponding first stereo beam when a terminal device is in a landscape mode and a rear-facing camera is enabled.
Figure 7:
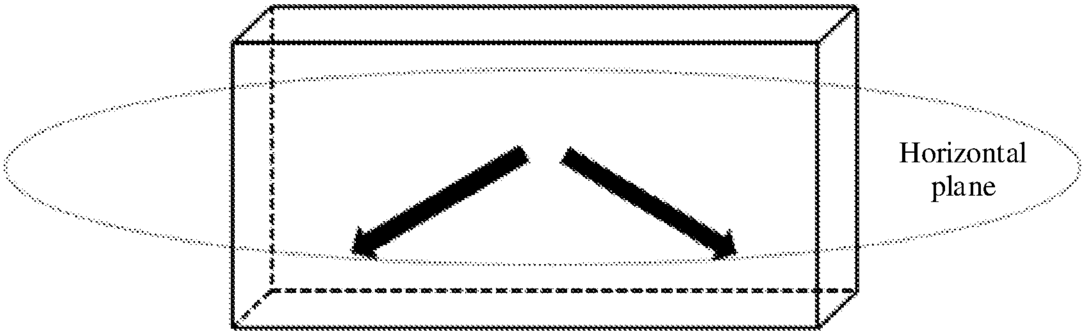
FIG. 7 is a schematic diagram of a corresponding first stereo beam when a terminal device is in a landscape mode and a front-facing camera is enabled.
Figure 8:
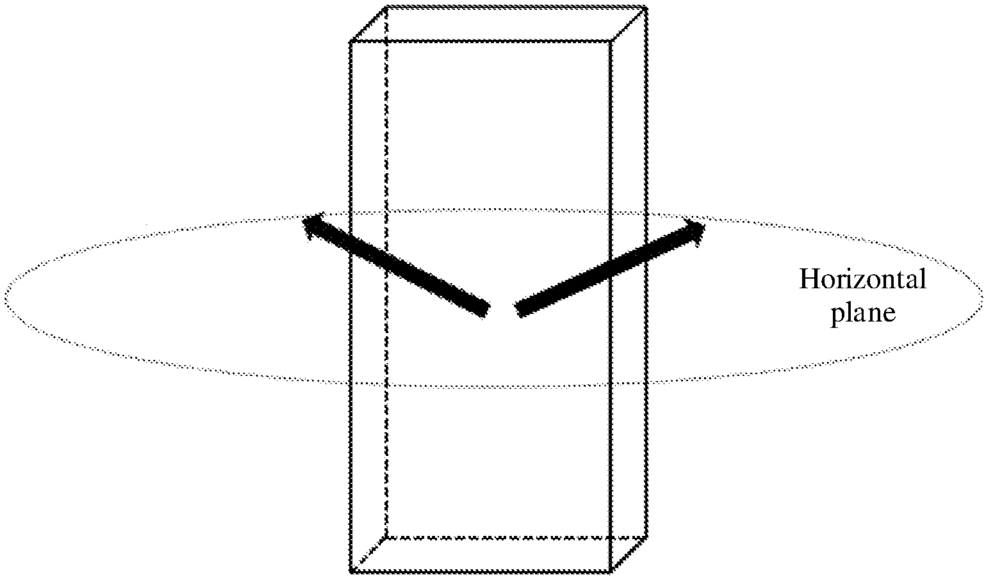
FIG. 8 is a schematic diagram of a corresponding first stereo beam when a terminal device is in a portrait mode and a rear-facing camera is enabled.
Figure 9:
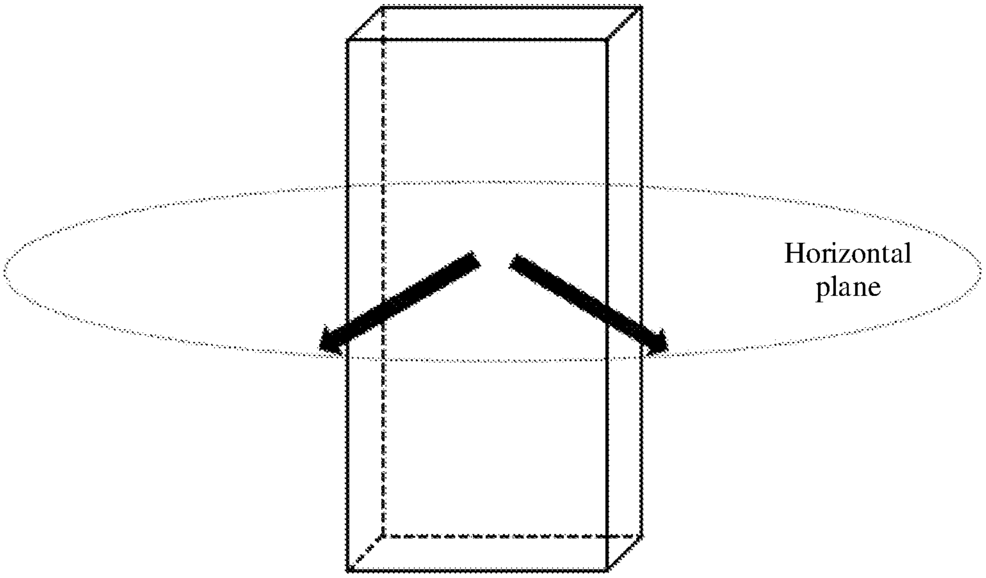
FIG. 9 is a schematic diagram of a corresponding first stereo beam when a terminal device is in a portrait mode and a front-facing camera is enabled.

For example, FIG. 6 to FIG. 9 are schematic diagrams in which a direction of a first stereo beam changes according to switching between a landscape mode and a portrait mode of a terminal device and enabling of a front-facing camera or a rear-facing camera. A terminal device in FIG. 6 is in a landscape mode and enables a rear-facing camera for shooting, a terminal device in FIG. 7 is in a landscape mode and enables a front-facing camera for shooting, a terminal device in FIG. 8 is in a portrait mode and enables a rear-facing camera for shooting, and a terminal device in FIG. 9 is in a portrait mode and enables a front-facing camera for shooting.

In FIG. 6 to FIG. 9, a left arrow and a right arrow respectively represent directions of a left beam and a right beam, and the first stereo beam may be understood as a composite beam of the left beam and the right beam. A horizontal plane is a plane perpendicular to a vertical side in a current photographing posture (a landscape mode or a portrait mode) of the terminal device, and a primary axis of the formed first stereo beam is located in the horizontal plane. When the terminal device switches between the landscape mode and the portrait mode, the direction of the first stereo beam also changes accordingly. For example, the primary axis of the first stereo beam shown in FIG. 6 is located on a horizontal plane perpendicular to a vertical side of the terminal device in the landscape mode. After the terminal device switches to the portrait mode, the primary axis of the first stereo beam is located on a horizontal plane perpendicular to a vertical side of the terminal device in the portrait mode, as shown in FIG. 8.

In addition, because the shooting direction of the enabled camera is generally a direction in which the user focuses on sound pickup, the direction of the first stereo beam also changes with the shooting direction of the enabled camera. For example, in FIG. 6 and FIG. 8, the direction of the first stereo beam points to a shooting direction of the rear-facing camera. In FIG. 7 and FIG. 9, the direction of the first stereo beam points to a shooting direction of the front-facing camera.

It can be learned that in different video recording scenarios, the plurality of pieces of target sound pickup data correspond to different first target beam parameter groups, to form first stereo beams in different directions, so that the direction of the first stereo beam is adaptively adjusted according to switching between the landscape mode and the portrait mode of the terminal device and enabling of the front-facing camera and the rear-facing camera, to ensure that better stereo recording effects can be obtained when the terminal device records a video.

Figure 10:
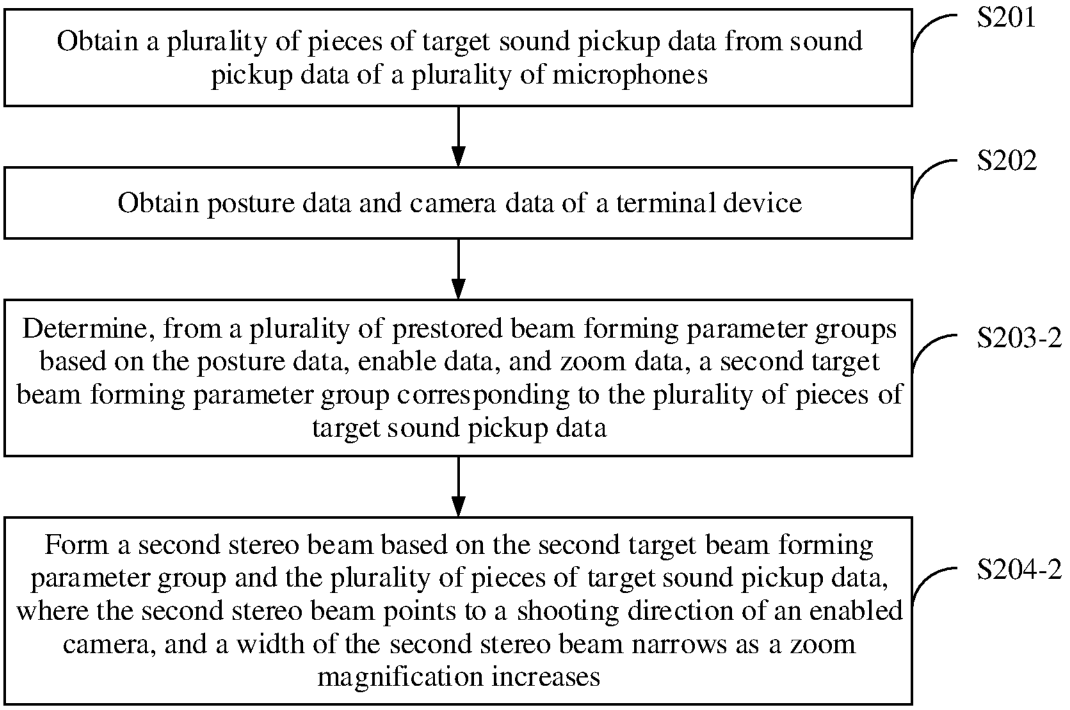
FIG. 10 is still another schematic flowchart of a stereo sound pickup method according to an embodiment of the present invention.

In some embodiments, when recording a video by using the terminal device, the user not only performs landscape/portrait switching on the terminal device and selects different cameras for shooting, but also performs zooming based on a distance of a shooting subject. In this case, the camera data may include the enable data and zoom data. The zoom data is a zoom magnification of the enabled camera indicated by the enable data. As shown in FIG. 10, step S203 may include substep S203-2 of determining, from the plurality of prestored beam parameter groups based on the posture data, the enable data, and the zoom data, a second target beam parameter group corresponding to the plurality of pieces of target sound pickup data. Step S204 may include substep S204-2 of forming a second stereo beam based on the second target beam parameter group and the plurality of pieces of target sound pickup data, where the second stereo beam points to a shooting direction of the enabled camera, and a width of the second stereo beam narrows as the zoom magnification increases.

The width of the second stereo beam narrows as the zoom magnification of the enabled camera increases, so that sound images can be more concentrated. The user usually performs zooming in a long-distance sound pickup scenario, and a signal-to-noise ratio of a subject is lower. Narrowing the second stereo beam can improve the signal-to-noise ratio, so that the terminal device has better recording robustness in a case of a low signal-to-noise ratio, thereby obtaining better stereo recording effects.

In this embodiment, to implement that the width of the second stereo beam narrows as the zoom magnification of the enabled camera increases, shapes of the subject corresponding to the second stereo beam in cases of different posture data, enable data, and zoom data may be preset, and then the matched beam parameter group is obtained through training by using the least square method, so that the second stereo beam formed based on the beam parameter group approximates to the set subject shape. Therefore, beam parameter groups corresponding to different posture data, enable data, and zoom data are obtained.

Figure 11A:
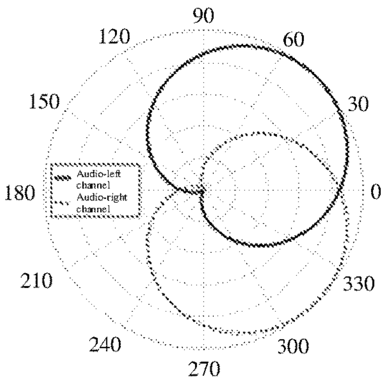
FIG. 11*a* to FIG. 11*c* are schematic diagrams in which a width of a second stereo beam varies with a zoom magnification of an enabled camera.
Figure 11B:
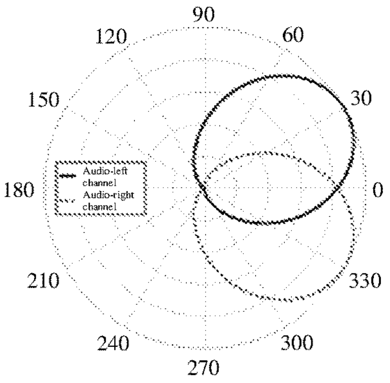
Figure 11C:
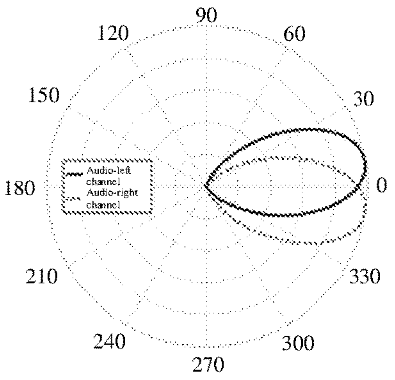

When the user records a video by using the terminal device, as a zoom magnification increases or decreases, the terminal device may match second target beam parameter groups corresponding to different zoom magnifications, to form second stereo beams of different widths based on the second target beam parameter group and a plurality of pieces of target sound pickup data, to meet a video recording requirement of the user. For example, FIG. 11*a* to FIG. 11*c* are schematic diagrams in which a width of a second stereo beam varies with a zoom magnification of an enabled camera. In FIG. 11*a* to FIG. 11*c*, the second stereo beam is the composite beam of the left beam and the right beam, and a 0-degree direction is the shooting direction (which may also be referred to as a target direction) of the camera enabled when the user records a video. When the user records a video by using a low zoom magnification, the terminal device may match a second target beam parameter group corresponding to the low zoom magnification, to form a wide second stereo beam shown in FIG. 11*a*. The left beam and the right beam in FIG. 11*a* respectively point to 45 degrees left and right of the shooting direction. When the user records a video by using a medium zoom magnification, the terminal device may match a second target beam parameter group corresponding to the medium zoom magnification, to form a narrowed second stereo beam shown in FIG. 11*b*. Directions of the left beam and the right beam in FIG. 11*b* are narrowed to about 30 degrees left and right of the shooting direction. When the user records a video by using a high zoom magnification, the terminal device may match a second target beam parameter group corresponding to the high zoom magnification, to form a further narrowed second stereo beam shown in FIG. 11*c*. Directions of the left beam and the right beam in FIG. 11*c* are further narrowed to about 10 degrees left and right of the shooting direction.

It can be learned from FIG. 11*a* to FIG. 11*c* that the width of the second stereo beam narrows as the zoom magnification of the enabled camera increases, so that a noise reduction capability in a non-target direction can be improved. The left beam is used as an example. In FIG. 11*a*, the left beam almost has no suppression effect on sound pickup data in a 60-degree direction. In FIG. 11*b*, the left beam has specific suppression effect on sound pickup data in the 60-degree direction. In FIG. 11*c*, the left beam has great suppression effect on sound pickup data in the 60-degree direction.

It can be learned that, when the user uses the terminal device to record a video and performs zooming, different second target beam parameter groups may be determined according to switching between the landscape mode and the portrait mode of the terminal device, enabling of the front-facing camera and the rear-facing camera, and a zoom magnification change of the enabled camera, so as to form second stereo beams in different directions and widths. In this way, a direction and a width of the second stereo beam can be adaptively adjusted based on the posture of the terminal device, the enabled camera, and the zoom magnification change, so that good recording robustness can be implemented in a noisy environment and a long-distance sound pickup condition.

In actual application, when the user uses the terminal device to record a video, in addition to being interfered by ambient noise, stereo recording effects are prone to be affected because a microphone is blocked by a finger or another part when the user holds the terminal device, or because dirt enters a sound conduction hole and blocks the microphone. In addition, as functions of the terminal device become stronger, self-noise of the terminal device (that is, noise generated by an internal circuit of the terminal device) is increasingly prone to be picked up by the microphone, for example, motor noise of the camera, Wi-Fi interference noise, and noise caused by capacitor charging and discharging. In addition, due to zooming or other operations, a finger or another part of the user may touch the screen or rub against an area near the microphone hole, resulting in some abnormal sounds that are not expected by the user. The interference of the self-noise or abnormal sounds affects the stereo recording effects of the video to some extent.

Based on this, this embodiment proposes that after sound pickup data of a plurality of microphones is obtained, a plurality of pieces of target sound pickup data used to form a stereo beam are determined by performing microphone blocking detection on the plurality of microphones and performing abnormal sound processing on the sound pickup data of the plurality of microphones, so that better recording robustness is still implemented in a case of abnormal sound interference and/or microphone blocking, and good stereo recording effects are ensured. The following describes in detail a process of obtaining the plurality of pieces of target sound pickup data.

Figure 12:
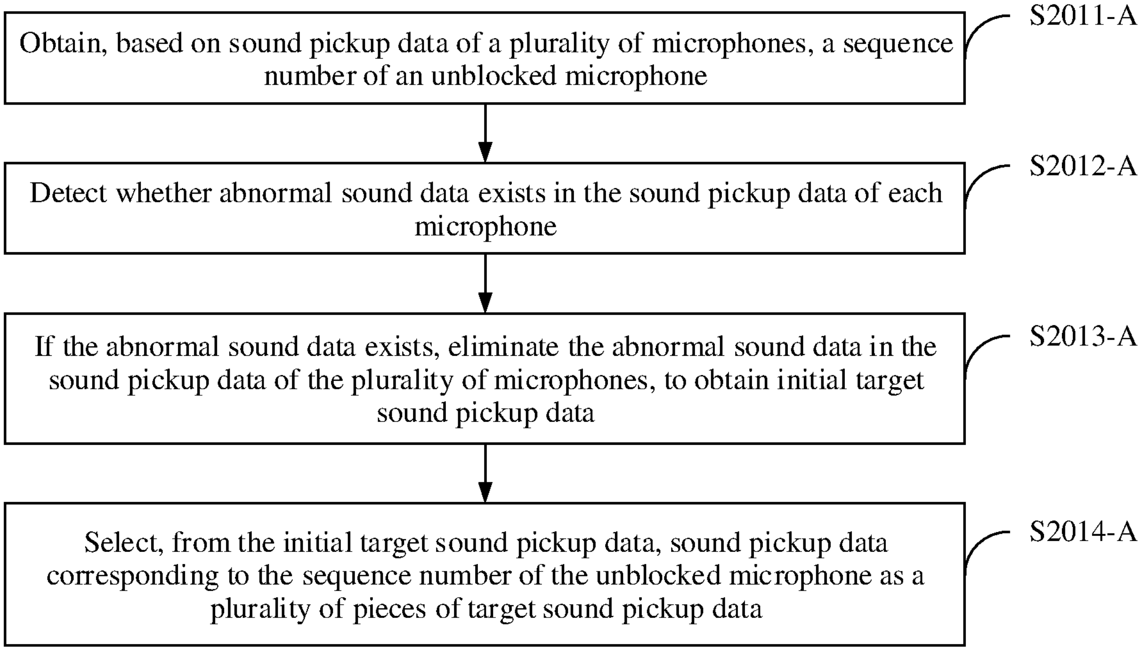
FIG. 12 is a schematic flowchart of substeps of S201 in FIG. 4.

As shown in FIG. 12, S201 includes the following substeps.

S2011-A: Obtain, based on the sound pickup data of the plurality of microphones, a sequence number of an unblocked microphone.

Optionally, after obtaining the sound pickup data of the plurality of microphones, the terminal device may perform time domain framing processing and frequency domain transformation processing on the sound pickup data of each microphone, to obtain time domain information and frequency domain information that correspond to the sound pickup data of each microphone; separately compare time domain information and frequency domain information that correspond to sound pickup data of different microphones, to obtain a time domain comparison result and a frequency domain comparison result; determine, based on the time domain comparison result and the frequency domain comparison result, a sequence number of a blocked microphone; and determine, based on the sequence number of the blocked microphone, the sequence number of the unblocked microphone. When time domain analysis is performed on signals, that time domain information is the same does not mean that the two signals are completely the same, and the signals need to be further analyzed from a perspective of frequency domain. Therefore, in this embodiment, the sound pickup data of the microphone is analyzed from two different perspectives: the time domain and the frequency domain, so that accuracy of microphone blocking detection can be effectively improved, and misdetermination of microphone blocking caused by analysis from a single perspective can be avoided. In an example, time domain information may be an RMS (Root-Mean-Square, root-mean-square) value of a time domain signal corresponding to sound pickup data, and frequency domain information may be an RMS value of a high frequency part above a specified frequency (for example, 2 KHz) of a frequency domain signal corresponding to the sound pickup data. A feature of the RMS value of the high frequency part is more obvious when a microphone is blocked.

In an actual application, when there is a blocked microphone in the terminal device, in sound pickup data of a blocked microphone and sound pickup data of an unblocked microphone, an RMS value of a time domain signal and an RMS value of a high frequency part are different. Even for unblocked microphones, an RMS value of a time domain signal and an RMS value of a high frequency part are slightly different due to factors such as structures of the microphones and blocking of a housing of the terminal device. Therefore, in a development phase of the terminal device, a difference between a blocked microphone and an unblocked microphone needs to be found, and a corresponding time domain threshold and a corresponding frequency domain threshold are set based on the difference, to be respectively used to compare, in time domain, RMS values of time domain signals corresponding to sound pickup data of different microphones, to obtain a time domain comparison result, and compare, in frequency domain, RMS values of high frequency parts corresponding to sound pickup data of different microphones, to obtain a frequency domain comparison result. Further, with reference to the time domain comparison result and the frequency domain comparison result, it is determined whether there is a blocked microphone. In this embodiment, the time domain threshold and the frequency domain threshold may be empirical values obtained by persons skilled in the art through experiments.

For example, the terminal device includes three microphones. Sequence numbers of the three microphones are respectively m1, m2, and m3, RMS values of time domain signals corresponding to sound pickup data of the three microphones are respectively A1, A2, and A3, and RMS values of high frequency parts corresponding to the sound pickup data of the three microphones are respectively B1, B2, and B3. When time domain information corresponding to the sound pickup data of the three microphones is compared in time domain, differences between A1 and A2, A1 and A3, and A2 and A3 may be separately calculated, and each of the differences is compared with a set time domain threshold. When the difference does not exceed the time domain threshold, it is considered that time domain information corresponding to sound pickup data of the two microphones is consistent. When the difference is greater than the time domain threshold, it is considered that time domain information corresponding to sound pickup data of the two microphones is inconsistent, and a value relationship of the time domain information corresponding to the sound pickup data of the two microphones is determined. Similarly, when frequency domain information corresponding to the sound pickup data of the three microphones is compared in frequency domain, differences between B1 and B2, B1 and B3, and B2 and B3 may be separately calculated, and each of the differences is compared with a set frequency domain threshold. When the difference does not exceed the frequency domain threshold, it is considered that frequency domain information corresponding to the sound pickup data of the two microphones is consistent. When the difference is greater than the frequency domain threshold, it is considered that frequency domain information corresponding to the sound pickup data of the two microphones is inconsistent, and a value relationship of the frequency domain information corresponding to the sound pickup data of the two microphones is determined.

In this embodiment, when it is determined, based on the time domain comparison result and the frequency domain comparison result, whether there is a blocked microphone, if it is expected to detect the blocked microphone as much as possible, the blocked microphone may be determined based on inconsistency between the time domain information and the frequency domain information of the two microphones. For example, when time domain information and frequency domain information corresponding to sound pickup data of different microphones are separately compared, an obtained time domain comparison result is: A1=A2=A3, and an obtained frequency domain comparison result is: B1<B2, B1<B3, and B2=B3. In this case, it may be determined, based on the time domain comparison result and the frequency domain comparison result, that a sequence number of the blocked microphone is m1, and sequence numbers of unblocked microphones are m2 and m3.

To avoid false detection, the blocked microphone may be determined based on that both time domain information and frequency domain information of the two microphones are inconsistent. For example, when time domain information and frequency domain information corresponding to sound pickup data of different microphones are separately compared, an obtained time domain comparison result is: A1<A2, A1<A3, and A2=A3, and an obtained frequency domain comparison result is: B1<B2, B1<B3, and B2=B3. In this case, it may be determined, based on the time domain comparison result and the frequency domain comparison result, that the sequence number of the blocked microphone is m1, and the sequence numbers of the unblocked microphones are m2 and m3.

S2012-A: Detect whether abnormal sound data exists in the sound pickup data of each microphone.

In this embodiment, frequency domain transformation processing may be performed on the sound pickup data of each microphone to obtain frequency domain information corresponding to the sound pickup data of each microphone; and it is detected, based on a pre-trained abnormal sound detection network and the frequency domain information corresponding to the sound pickup data of each microphone, whether the abnormal sound data exists in the sound pickup data of each microphone.

The pre-trained abnormal sound detection network may be obtained by collecting a large amount of abnormal sound data (for example, some sound data with a specific frequency) in a development phase of the terminal device and performing feature learning by using an AI (Artificial Intelligence, artificial intelligence) algorithm. In a detection phase, the frequency domain information corresponding to the sound pickup data of each microphone is input into the pre-trained abnormal sound detection network, to obtain a detection result indicating whether the abnormal sound data exists.

S2013-A: If the abnormal sound data exists, eliminate the abnormal sound data in the sound pickup data of the plurality of microphones, to obtain initial target sound pickup data.

In this embodiment, the abnormal sound data may include abnormal sounds such as self-noise of the terminal device, or noise generated when the user touches a screen or rubs against a microphone hole by using a finger. The abnormal sound data may be eliminated by using the AI algorithm in combination with a time-domain filtering manner and a frequency-domain filtering manner. Optionally, when the abnormal sound data is detected, a gain of a frequency of the abnormal sound data may be reduced, that is, multiplied by a value between 0 and 1, so as to eliminate the abnormal sound data or reduce an intensity of the abnormal sound data.

In an example, whether preset sound data exists in the abnormal sound data may be detected by using a pre-trained sound detection network. The pre-trained sound detection network may be obtained by performing feature learning by using the AI algorithm. The preset sound data may be understood as non-noise data that the user expects to record, for example, a speech sound or music. When it is detected, by using the pre-trained sound detection network, that the non-noise data that the user expects to record exists, the abnormal sound data does not need to be eliminated, only an intensity of the abnormal sound data needs to be reduced (for example, multiplied by a value 0.5). When it is detected, by using the pre-trained sound detection network, that the non-noise data that the user expects to record does not exist, the abnormal sound data is directly eliminated (for example, multiplied by a value 0).

S2014-A: Select, from the initial target sound pickup data, sound pickup data corresponding to the sequence number of the unblocked microphone as the plurality of pieces of target sound pickup data.

For example, in microphones whose sequence numbers are respectively m1, m2, and m3, if a sequence number of a blocked microphone is m1, and sequence numbers of unblocked microphones are m2 and m3, sound pickup data corresponding to the sequence numbers m2 and m3 may be selected from the initial target sound pickup data as the target sound pickup data, to obtain the plurality of pieces of target sound pickup data for subsequently forming a stereo beam.

It should be noted that S2011-A may be performed before S2012-A, or may be performed after S2012-A, or may be performed simultaneously with S2012-A. That is, this embodiment does not limit the sequence of microphone blocking detection and abnormal sound data processing.

In this embodiment, the plurality of pieces of target sound pickup data used to form the stereo beam may be determined with reference to microphone blocking detection and abnormal sound processing of sound pickup data of a microphone. When the user records a video by using the terminal device, even if a microphone is blocked and abnormal sound data exists in sound pickup data of the microphone, good stereo recording effects can still be ensured, so that good recording robustness is implemented. In actual application, the plurality of pieces of target sound pickup data used to form the stereo beam may be further determined by performing microphone blocking detection on a microphone or performing abnormal sound processing on sound pickup data of the microphone.

Figure 13:
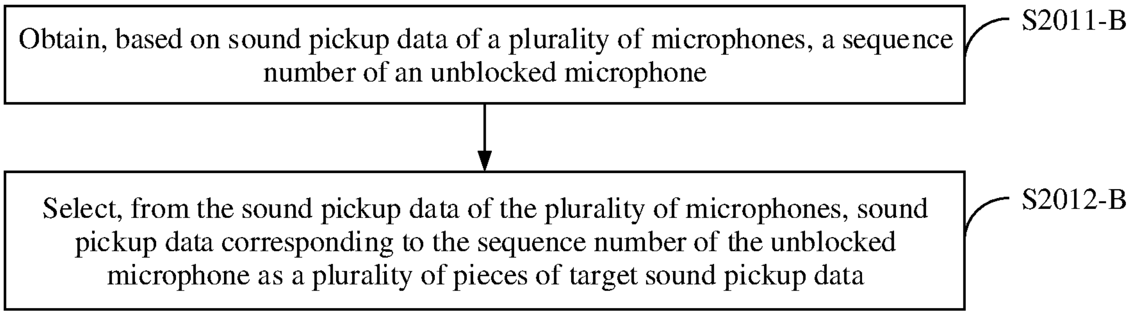
FIG. 13 is another schematic flowchart of substeps of S201 in FIG. 4.

As shown in FIG. 13, when the plurality of pieces of target sound pickup data used to form the stereo beam are determined by performing microphone blocking detection on the microphone, S201 includes the following substeps:

S2011-B: Obtain, based on the sound pickup data of the plurality of microphones, a sequence number of an unblocked microphone.

For specific content of S2011-B, refer to S2011-A. Details are not described herein again.

S2012-B: Select, from the sound pickup data of the plurality of microphones, sound pickup data corresponding to the sequence number of the unblocked microphone as the plurality of pieces of target sound pickup data.

For example, in microphones whose sequence numbers are respectively m1, m2, and m3, if a sequence number of a blocked microphone is m1, and sequence numbers of unblocked microphones are m2 and m3, sound pickup data of the microphones whose sequence numbers are m2 and m3 is selected from sound pickup data of the three microphones as the target sound pickup data, to obtain the plurality of pieces of target sound pickup data.

It can be learned that, for a case in which a microphone may be blocked when the user records a video, after obtaining the sound pickup data of the plurality of microphones, the terminal device performs microphone blocking detection on the plurality of microphones based on the sound pickup data of the plurality of microphones, to obtain a sequence number of an unblocked microphone, and selects sound pickup data corresponding to the sequence number of the unblocked microphone, to subsequently form the stereo beam. In this way, when the terminal device records a video, sound quality is not significantly reduced or stereo is not significantly unbalanced due to microphone blocking, that is, when a microphone is blocked, stereo recording effects can be ensured, and recording robustness is good.

Figure 14:
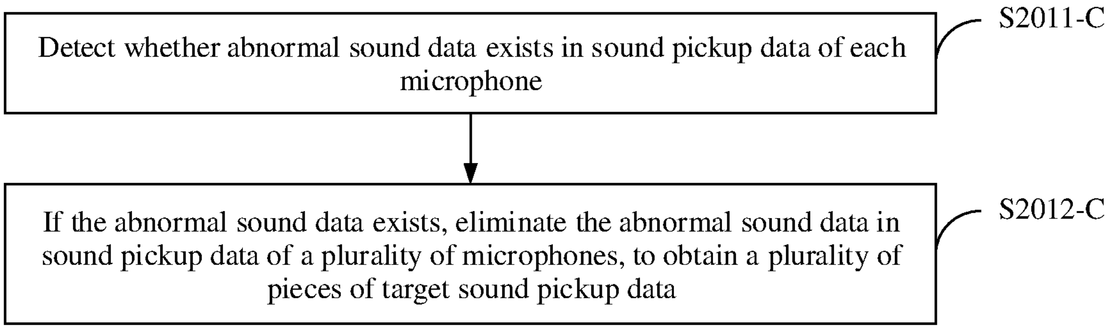
FIG. 14 is still another schematic flowchart of substeps of S201 in FIG. 4.

As shown in FIG. 14, when the plurality of pieces of target sound pickup data used to form the stereo beam are determined by performing abnormal sound processing on the sound pickup data of the microphone, S201 includes the following substeps:

S2011-C: Detect whether abnormal sound data exists in the sound pickup data of each microphone.

For specific content of S2011-C, refer to S2012-A. Details are not described herein again.

S2012-C: If the abnormal sound data exists, eliminate the abnormal sound data in the sound pickup data of the plurality of microphones, to obtain the plurality of pieces of target sound pickup data.

In other words, after obtaining the sound pickup data of the plurality of microphones, the terminal device may perform abnormal sound detection and abnormal sound elimination processing on the sound pickup data of the plurality of microphones, to obtain "clean" sound pickup data (that is, the plurality of pieces of target sound pickup data) for subsequently forming the stereo beam. In this way, when the terminal device records a video, impact of the abnormal sound data, such as noise generated when a finger rubs against a microphone and self-noise of the terminal device, on stereo recording effects is effectively reduced.

Figure 15:
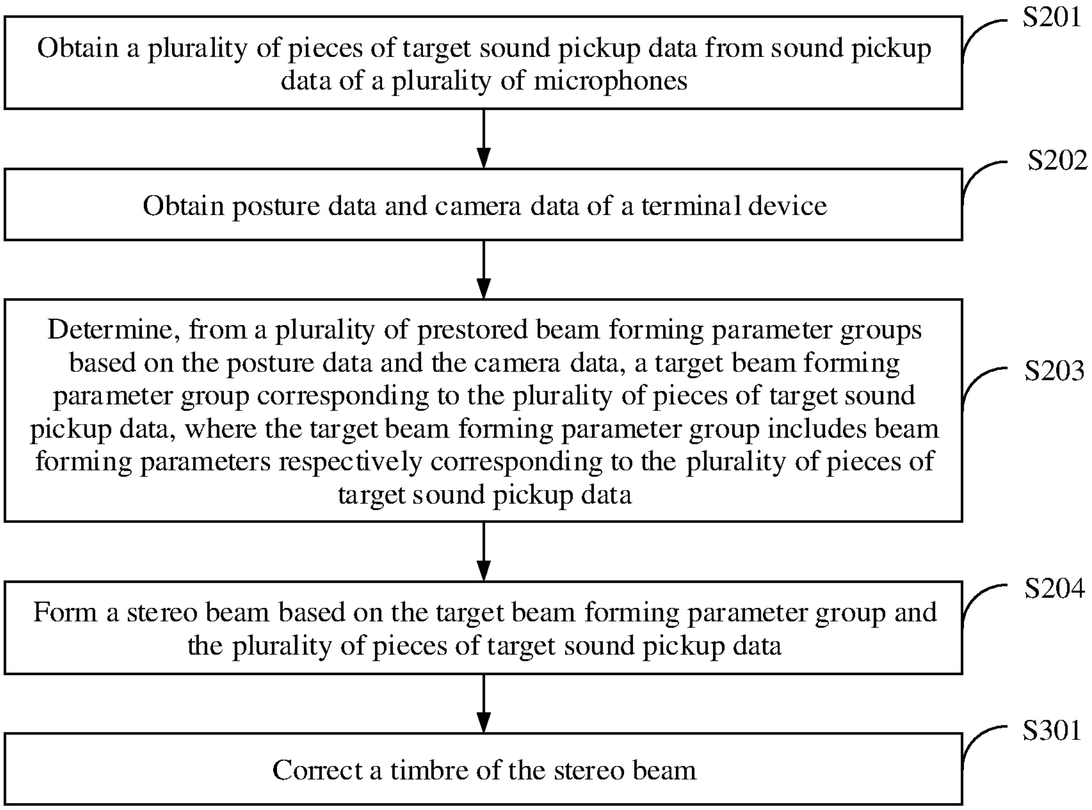
FIG. 15 is yet another schematic flowchart of a stereo sound pickup method according to an embodiment of the present invention.

In actual application, due to a frequency response change generated when a sound wave is transmitted from a microphone hole of the terminal device to an analog-to-digital conversion process, for example, factors such as an uneven frequency response of a microphone body, a resonance effect of a microphone pipe, and a filter circuit, the stereo recording effects are also affected to some extent. Based on this, refer to FIG. 15. After the stereo beam is formed based on the target beam parameter group and the plurality of pieces of target sound pickup data (that is, after step S204), the stereo sound pickup method further includes the following step:

S301: Correct a timbre of the stereo beam.

By correcting the timbre of the stereo beam, a frequency response may be corrected to be straight, so as to obtain better stereo recording effects.

Figure 16:
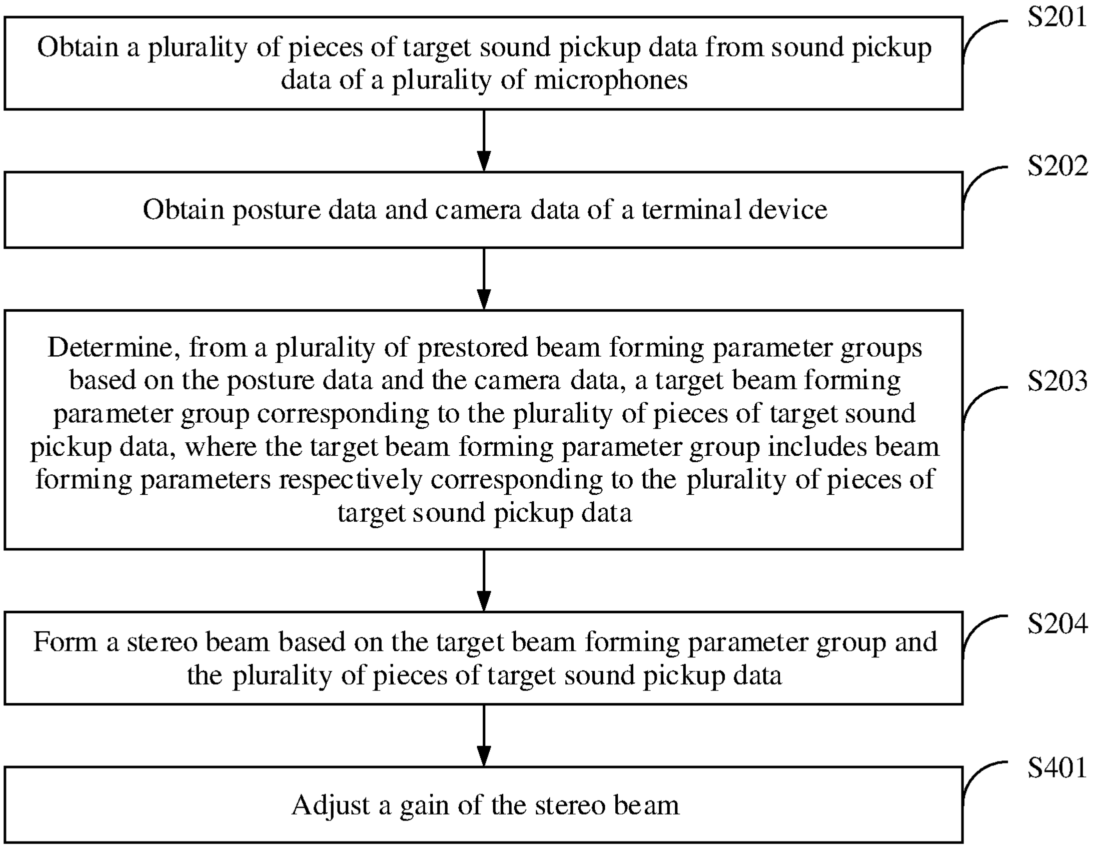
FIG. 16 is still yet another schematic flowchart of a stereo sound pickup method according to an embodiment of the present invention.

In some embodiments, to adjust a sound recorded by the user to proper volume, gain control may be further performed on the generated stereo beam. Refer to FIG. 16. After the stereo beam is formed based on the target beam parameter group and the plurality of pieces of target sound pickup data (that is, after step S204), the stereo sound pickup method further includes the following step:

S401: Adjust a gain of the stereo beam.

By adjusting the gain of the stereo beam, sound pickup data of low volume can be heard clearly, and clipping distortion does not occur on sound pickup data of high volume, so that a sound recorded by the user is adjusted to proper volume. This improves video recording experience of the user.

In actual application, the user usually performs zooming in a long-distance sound pickup scenario. In this case, volume of a target sound source decreases due to a long distance, affecting effects of recorded sounds. Based on this, this embodiment proposes that the gain of the stereo beam is adjusted based on a zoom magnification of a camera. In the long-distance sound pickup scenario, as the zoom magnification increases, a gain amplification amount also increases. This ensures that volume of the target sound source in the long-distance sound pickup scenario is still clear and loud.

It should be noted that, in an actual video recording process, after forming the stereo beam based on the target beam parameter group and the plurality of pieces of target sound pickup data, the terminal device may first perform timbre correction on the stereo beam, and then adjust the gain of the stereo beam, to obtain better stereo recording effects.

Figure 17:
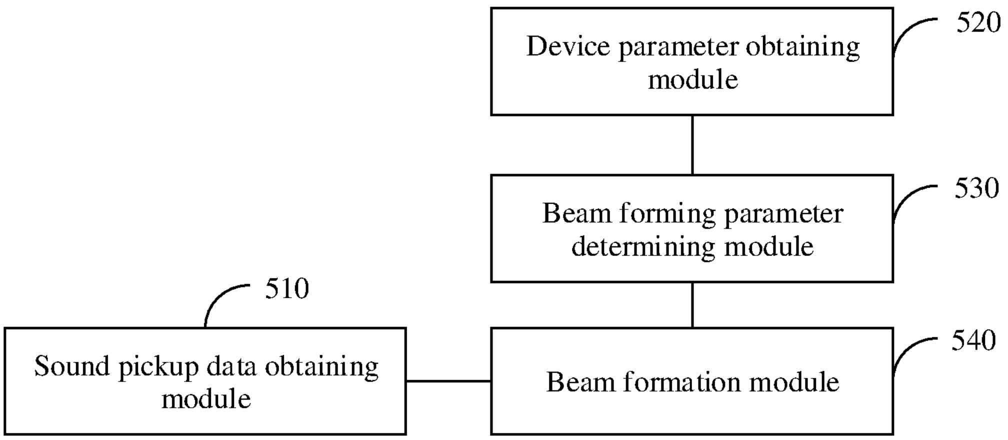
FIG. 17 is a schematic diagram of function modules of a stereo sound pickup apparatus according to an embodiment of the present invention.

To perform corresponding steps in the foregoing embodiments and each possible implementation, the following provides an implementation of a stereo sound pickup apparatus. FIG. 17 is a diagram of function modules of a stereo sound pickup apparatus according to an embodiment of the present invention. It should be noted that a basic principle and a technical effect of the stereo sound pickup apparatus provided in this embodiment are the same as those in the foregoing embodiments. For brief description, for parts that are not mentioned in this embodiment, refer to corresponding content in the foregoing embodiments. The stereo sound pickup apparatus includes: a sound pickup data obtaining module 510, a device parameter obtaining module 520, a beam parameter determining module 530, and a beam formation module 540.

The sound pickup data obtaining module 510 is configured to obtain a plurality of pieces of target sound pickup data from sound pickup data of a plurality of microphones.

It may be understood that the sound pickup data obtaining module 510 may perform S201.

The device parameter obtaining module 520 is configured to obtain posture data and camera data of a terminal device.

It may be understood that the device parameter obtaining module 520 may perform S202.

The beam parameter determining module 530 is configured to determine, from a plurality of prestored beam parameter groups based on the posture data and the camera data, a target beam parameter group corresponding to the plurality of pieces of target sound pickup data. The target beam parameter group includes beam parameters respectively corresponding to the plurality of pieces of target sound pickup data.

It may be understood that the beam parameter determining module 530 may perform S203.

The beam formation module 540 is configured to form a stereo beam based on the target beam parameter group and the plurality of pieces of target sound pickup data.

It may be understood that the beam formation module 540 may perform S204.

In some embodiments, the camera data may include enable data. The enable data indicates an enabled camera. The beam parameter determining module 530 is configured to determine, from the plurality of prestored beam parameter groups based on the posture data and the enable data, a first target beam parameter group corresponding to the plurality of pieces of target sound pickup data. The beam formation module 540 is configured to form a first stereo beam based on the first target beam parameter group and the plurality of pieces of target sound pickup data. The first stereo beam points to a shooting direction of the enabled camera.

Optionally, the plurality of beam parameter groups includes a first beam parameter group, a second beam parameter group, a third beam parameter group, and a fourth beam parameter group, and beam parameters in the first beam parameter group, the second beam parameter group, the third beam parameter group, and the fourth beam parameter group are different.

When the posture data indicates that the terminal device is in a landscape mode, and the enable data indicates that a rear-facing camera is enabled, the first target beam parameter group is the first beam parameter group. When the posture data indicates that the terminal device is in a landscape mode, and the enable data indicates that a front-facing camera is enabled, the first target beam parameter group is the second beam parameter group. When the posture data indicates that the terminal device is in a portrait mode, and the enable data indicates that a rear-facing camera is enabled, the first target beam parameter group is the third beam parameter group. When the posture data indicates that the terminal device is in a portrait mode, and the enable data indicates that a front-facing camera is enabled, the first target beam parameter group is the fourth beam parameter group.

It may be understood that the beam parameter determining module 530 may perform S203-1, and the beam formation module 540 may perform S204-1.

In some other embodiments, the camera data may include enable data and zoom data. The zoom data is a zoom magnification of an enabled camera indicated by the enable data. The beam parameter determining module 530 is configured to determine, from the plurality of prestored beam parameter groups based on the posture data, the enable data, and the zoom data, a second target beam parameter group corresponding to the plurality of pieces of target sound pickup data. The beam formation module 540 may form a second stereo beam based on the second target beam parameter group and the plurality of pieces of target sound pickup data. The second stereo beam points to a shooting direction of the enabled camera, and a width of the second stereo beam narrows as the zoom magnification increases.

It may be understood that the beam parameter determining module 530 may perform S203-2, and the beam formation module 540 may perform S204-2.

Figure 18:
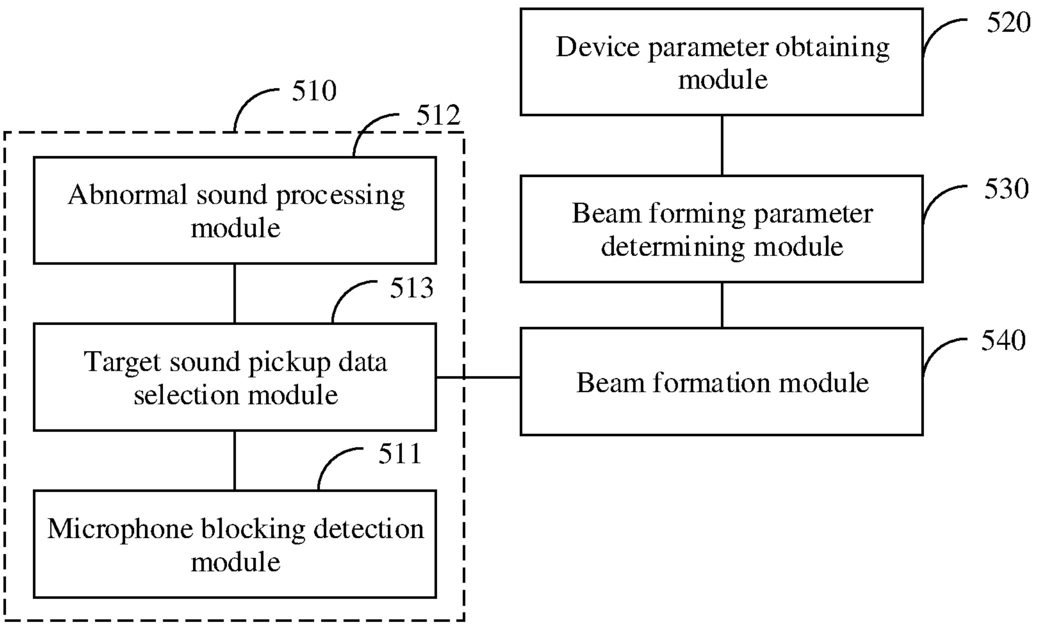
FIG. 18 is another schematic diagram of function modules of a stereo sound pickup apparatus according to an embodiment of the present invention.

Refer to FIG. 18. The sound pickup data obtaining module 510 may include a microphone blocking detection module 511 and/or an abnormal sound processing module 512, and a target sound pickup data selection module 513. A plurality of pieces of target sound pickup data may be obtained from sound pickup data of a plurality of microphones by using the microphone blocking detection module 511 and/or the abnormal sound processing module 512, and the target sound pickup data selection module 513.

Optionally, when the plurality of pieces of target sound pickup data is obtained by using the microphone blocking detection module 511, the abnormal sound processing module 512, and the target sound pickup data selection module 513, the microphone blocking detection module 511 is configured to obtain, based on the sound pickup data of the plurality of microphones, a sequence number of an unblocked microphone; the abnormal sound processing module 512 is configured to: detect whether abnormal sound data exists in the sound pickup data of each microphone, and if the abnormal sound data exists, eliminate the abnormal sound data in the sound pickup data of the plurality of microphones, to obtain initial target sound pickup data; and the target sound pickup data selection module 513 is configured to select, from the initial target sound pickup data, sound pickup data corresponding to the sequence number of the unblocked microphone as the plurality of pieces of target sound pickup data.

The microphone blocking detection module 511 is configured to: perform time domain framing processing and frequency domain transformation processing on the sound pickup data of each microphone, to obtain time domain information and frequency domain information that correspond to the sound pickup data of each microphone; separately compare time domain information and frequency domain information that correspond to sound pickup data of different microphones, to obtain a time domain comparison result and a frequency domain comparison result; determine, based on the time domain comparison result and the frequency domain comparison result, a sequence number of a blocked microphone; and determine, based on the sequence number of the blocked microphone, the sequence number of the unblocked microphone.

The abnormal sound processing module 512 is configured to: perform frequency domain transformation processing on the sound pickup data of each microphone to obtain frequency domain information corresponding to the sound pickup data of each microphone; and detect, based on a pre-trained abnormal sound detection network and the frequency domain information corresponding to the sound pickup data of each microphone, whether the abnormal sound data exists in the sound pickup data of each microphone. When the abnormal sound data needs to be eliminated, whether preset sound data exists in the abnormal sound data may be detected by using a pre-trained sound detection network. If the preset sound data does not exist, the abnormal sound data is eliminated. If the preset sound data exists, an intensity of the abnormal sound data is reduced.

Optionally, when the plurality of pieces of target sound pickup data is obtained by using the microphone blocking detection module 511 and the target sound pickup data selection module 513, the microphone blocking detection module 511 is configured to obtain, based on the sound pickup data of the plurality of microphones, a sequence number of an unblocked microphone; and the target sound pickup data selection module 513 is configured to select, from the sound pickup data of the plurality of microphones, sound pickup data corresponding to the sequence number of the unblocked microphone as the plurality of pieces of target sound pickup data.

Optionally, when the plurality of pieces of target sound pickup data is obtained by using the abnormal sound processing module 512 and the target sound pickup data selection module 513, the abnormal sound processing module 512 is configured to: detect whether abnormal sound data exists in the sound pickup data of each microphone, and if the abnormal sound data exists, eliminate the abnormal sound data in the sound pickup data of the plurality of microphones, to obtain the plurality of pieces of target sound pickup data.

It may be understood that the microphone blocking detection module 511 may perform S2011-A and S2011-B; the abnormal sound processing module 512 may perform S2012-A, S2013-A, and S2011-C; and the target sound pickup data selection module 513 may perform S2014-A, S2012-B, and S2012-C.

Figure 19:
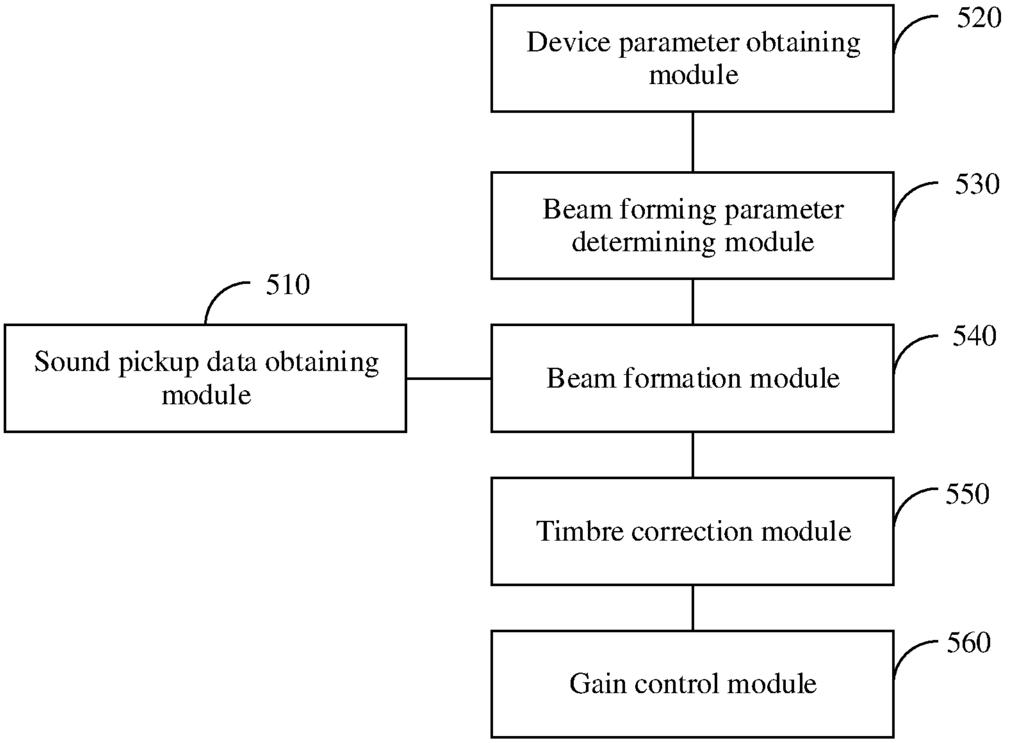
FIG. 19 is still another schematic diagram of function modules of a stereo sound pickup apparatus according to an embodiment of the present invention.

Refer to FIG. 19. The stereo sound pickup apparatus may further include a timbre correction module 550 and a gain control module 560.

The timbre correction module 550 is configured to correct a timbre of the stereo beam.

It may be understood that the timbre correction module may perform S301.

The gain control module 560 is configured to adjust a gain of the stereo beam.

The gain control module 560 may adjust the gain of the stereo beam based on the zoom magnification of the camera.

It may be understood that the gain control module 560 may perform S401.

An embodiment of the present invention further provides a computer-readable storage medium. The computer-readable storage medium stores a computer program, and when the computer program is read and run by a processor, the stereo sound pickup method disclosed in the foregoing embodiments is implemented.

An embodiment of the present invention further provides a computer program product. When the computer program product runs on a computer, the computer is enabled to perform the stereo sound pickup method disclosed in the foregoing embodiments.

An embodiment of the present invention further provides a chip system. The chip system includes a processor, and may further include a memory, configured to implement the stereo sound pickup method disclosed in the foregoing embodiments. The chip system may include a chip, or may include a chip and another discrete component.

In conclusion, according to the stereo sound pickup method and apparatus, the terminal device, and the computer-readable storage medium provided in embodiments of the present invention, because the target beam parameter group is determined based on the posture data and the camera data of the terminal device, when the terminal device is in different video recording scenarios, different posture data and camera data are obtained, so as to determine different target beam parameter groups. In this way, when the stereo beam is formed based on the target beam parameter group and the plurality of pieces of target sound pickup data, a direction of the stereo beam may be adjusted by using the different target beam parameter groups. This effectively reduces impact of noise in a recording environment, so that the terminal device can obtain better stereo recording effects in different video recording scenarios. In addition, by detecting a microphone blocking condition and performing elimination processing on various abnormal sound data, when a microphone is blocked and abnormal sound data exists, good stereo recording effects and good recording robustness can still be ensured when a video is recorded.

In the several embodiments provided in this application, it should be understood that the disclosed apparatus and method may also be implemented in other manners. The described apparatus embodiments are merely examples. For example, the flowcharts and block diagrams in the accompanying drawings show the system architectures, functions, and operations that may be implemented by the apparatuses, methods, and computer program products according to a plurality of embodiments of the present invention. In this regard, each block in the flowcharts or block diagrams may represent a module, a program segment, or a part of code, and the module, the program segment, or the part of code includes one or more executable instructions for implementing a specified logical function. It should also be noted that in some alternative implementations, a function marked in the block may also occur in a sequence different from that marked in the accompanying drawings. For example, two consecutive blocks may be actually executed substantially in parallel, and may sometimes be executed in a reverse order, depending on a function involved. It should also be noted that each block in the block diagrams and/or flowcharts, and the combination of the blocks in the block diagrams and/or flowcharts may be implemented by a special-purpose hardware-based system that performs a specified function or action, or may be implemented by a combination of special-purpose hardware and computer instructions.

In addition, function modules in embodiments of the present invention may be integrated together to form an independent part, or each of the modules may exist alone, or two or more modules are integrated to form an independent part.

When the functions are implemented in the form of a software function module and sold or used as an independent product, the functions may be stored in a computer-readable storage medium. Based on such an understanding, the technical solutions of the present invention essentially, or the part contributing to the conventional technology, or some of the technical solutions may be implemented in a form of a software product. The computer software product is stored in a storage medium, and includes several instructions for instructing a computer device (which may be a mobile phone, a tablet computer, or the like) to perform all or some of the steps of the methods described in embodiments of the present invention. The storage medium includes any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely embodiments of the present invention, but not intended to limit the present invention. Persons skilled in the art may make various changes and variations to the present invention. Any modification, equivalent replacement, or improvement made without departing from the principle of the present invention shall fall within the protection scope of the present invention.

What is claimed is:

1. A stereo sound pickup method, comprising:

configuring a terminal device to record a video, wherein the terminal device comprises a plurality of microphones;

configuring the plurality of microphones to capture a sound; and forming a stereo beam based on the captured sound;

wherein the stereo beam is related to a video recording scenario of the terminal device, and the video recording scenario comprises a posture of the terminal device and usage of a camera;

wherein the posture comprises that the terminal device is in a landscape mode or a portrait mode;

wherein the usage of the camera comprises that a rear-facing camera is used or a front-facing camera is used; and wherein the stereo beam is generated, in response to the plurality of microphones comprising a blocked microphone, based on a sound captured by an unblocked microphone.

2. The method according to claim 1, wherein a direction of the stereo beam changes with a shooting direction of an enabled camera.

3. The method according to claim 2, wherein the stereo beam points to at least one of a shooting direction of the rear-facing camera when the rear-facing camera is used or a shooting direction of the front-facing camera when the front-facing camera is used.

4. The method according to claim 1, wherein in the stereo beam, a weight of each of the plurality of microphones varies with the video recording scenario.

5. The method according to claim 1, wherein the video recording scenario further comprises zooming of a used camera.

6. The method according to claim 5, wherein a width of the stereo beam narrows as a zoom magnification increases.

7. The method according to claim 1, wherein a direction of the stereo beam changes with the posture of the terminal device.

8. The method according to claim 7, wherein a primary axis of the stereo beam is at least one of located, when the terminal device is in the landscape mode, on a horizontal plane perpendicular to a vertical side of the terminal device in the landscape mode, or located, when the terminal device is in the portrait mode, on a horizontal plane perpendicular to a vertical side of the terminal device in the portrait mode.

9. The method according to claim 1, further comprising obtaining posture data of the terminal device, wherein the posture data indicates that the terminal device is in the landscape mode or the portrait mode.

10. The method according to claim 9, further comprising obtaining camera data of the terminal device.

11. The method according to claim 10, wherein the camera data comprises enable data and zoom data, wherein the enable data indicates whether the rear-facing camera is used or the front-facing camera is used, and wherein the zoom data is a zoom magnification of an enabled camera indicated by the enable data.

12. The method according to claim 1, wherein the configuring the plurality of microphones to capture a sound comprises:

obtaining a plurality of pieces of target sound pickup data from sound pickup data of the plurality of microphones; and wherein the forming the stereo beam based on the captured sound comprises:

determining, based on the video recording scenario of the terminal device, a target beam parameter group corresponding to the plurality of pieces of target sound pickup data; and forming the stereo beam based on the target beam parameter group and the plurality of pieces of target sound pickup data.

13. The method according to claim 12, wherein at least one of:

the target beam parameter group is a first beam parameter group when the terminal device is in the landscape mode and the rear-facing camera is enabled;

the target beam parameter group is a second beam parameter group when the terminal device is in the landscape mode and the front-facing camera is enabled;

the target beam parameter group is a third beam parameter group when the terminal device is in the portrait mode and the rear-facing camera is enabled; or the target beam parameter group is a fourth beam parameter group when the terminal device is in the portrait mode and the front-facing camera is enabled; and wherein beam parameters in the first beam parameter group, the second beam parameter group, the third beam parameter group, and the fourth beam parameter group are different.

14. The method according to claim 13, wherein the obtaining the plurality of pieces of target sound pickup data from sound pickup data of the plurality of microphones comprises:

obtaining, based on the sound pickup data of the plurality of microphones, a sequence number of an unblocked microphone;

detecting whether abnormal sound data exists in the sound pickup data of each microphone;

performing, in response to the abnormal sound data existing, obtaining initial target sound pickup data by eliminating the abnormal sound data in the sound pickup data of the plurality of microphones; and selecting, from the initial target sound pickup data, sound pickup data corresponding to the sequence number of the unblocked microphone as the plurality of pieces of target sound pickup data.

15. The method according to claim 14, wherein the obtaining, based on the sound pickup data of the plurality of microphones, the sequence number of the unblocked microphone comprises:

obtaining time domain information and frequency domain information that correspond to the sound pickup data of each microphone by performing time domain framing processing and frequency domain transformation processing on the sound pickup data of each microphone;

obtaining a time domain comparison result and a frequency domain comparison result by separately comparing time domain information and frequency domain information that correspond to sound pickup data of different microphones;

determining, based on the time domain comparison result and the frequency domain comparison result, a sequence number of a blocked microphone; and determining, based on the sequence number of the blocked microphone, the sequence number of the unblocked microphone.

16. The method according to claim 1, wherein a quantity of the microphones is between 3 and 6, inclusive, and wherein at least one microphone is disposed on the front of a screen of the terminal device or on the back of the terminal device.

17. The method according to claim 16, wherein, with respect to the quantity of the microphones, at least one of:

the quantity of the microphones is 3, wherein one microphone is disposed on each of the top and the bottom of the terminal device, and wherein one microphone is disposed on at least one of the front of the screen of the terminal device or the back of the terminal device; or the quantity of the microphones is 4, wherein one microphone is disposed on at least one of the front of the screen of the terminal device or the back of the terminal device; or the quantity of the microphones is 6, wherein two microphones are disposed on each of the top and the bottom of the terminal device, and wherein one microphone is disposed on each of the front of the screen of the terminal device and the back of the terminal device.

18. A terminal device, comprising:

at least one processor; and a non-transitory memory storing a computer program for execution by the at least one processor, the computer program including instructions for:

configuring the terminal device to record a video;

configuring a plurality of microphones to capture a sound; and forming a stereo beam based on the captured sound;

wherein the stereo beam is related to a video recording scenario of the terminal device, and the video recording scenario comprises a posture of the terminal device and usage of a camera;

wherein the posture comprises that the terminal device is in a landscape mode or a portrait mode;

wherein the usage of the camera comprises that a rear-facing camera is used or a front-facing camera is used; and wherein the stereo beam is generated, in response to the plurality of microphones comprising a blocked microphone, based on a sound captured by an unblocked microphone.

19. A non-transitory computer-readable storage medium storing a computer program for execution by at least one processor of a terminal device, the computer program including instructions for:

configuring the terminal device to record a video;

configuring a plurality of microphones to capture a sound; and forming a stereo beam based on the captured sound;

wherein the stereo beam is related to a video recording scenario of the terminal device, and wherein the video recording scenario comprises a posture of the terminal device and usage of a camera;

wherein the posture comprises that the terminal device is in a landscape mode or a portrait mode;

wherein the usage of the camera comprises that a rear-facing camera is used or a front-facing camera is used; and wherein the stereo beam is generated, in response to the plurality of microphones comprising a blocked microphone, based on a sound captured by an unblocked microphone.

* * * * *